(12) United States Patent
Zhu et al.

(10) Patent No.: US 11,533,666 B2
(45) Date of Patent: Dec. 20, 2022

(54) COMMUNICATION METHOD, COMMUNICATIONS APPARATUS, AND COMMUNICATIONS SYSTEM

(71) Applicant: Huawei Technologies Co., Ltd., Shenzhen (CN)

(72) Inventors: Qianghua Zhu, Beijing (CN); Yali Yan, Shanghai (CN); Fenqin Zhu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 17/037,163

(22) Filed: Sep. 29, 2020

(65) Prior Publication Data
US 2021/0014759 A1    Jan. 14, 2021

Related U.S. Application Data

(63) Continuation of application No. PCT/CN2019/078598, filed on Mar. 19, 2019.

(30) Foreign Application Priority Data

Apr. 9, 2018 (CN) .......................... 201810313229.9

(51) Int. Cl.
| H04W 36/14 | (2009.01) |
| H04W 4/50 | (2018.01) |
| G06F 9/54 | (2006.01) |

(52) U.S. Cl.
CPC ............ *H04W 36/14* (2013.01); *G06F 9/546* (2013.01); *G06F 9/547* (2013.01); *H04W 4/50* (2018.02)

(58) Field of Classification Search
CPC ........ H04L 67/16; H04L 45/38; H04W 36/14; H04W 4/50; H04W 72/00; H04W 28/02; H04W 8/22; G06F 9/547
See application file for complete search history.

(56) References Cited

U.S. PATENT DOCUMENTS

| 2015/0248543 | A1 | 9/2015 | Yoshinari | |
| 2017/0149967 | A1* | 5/2017 | Chandrasekaran | ......................... H04M 3/42382 |

(Continued)

FOREIGN PATENT DOCUMENTS

| CN | 102143557 A | 8/2011 |
| CN | 105101468 A | 11/2015 |

(Continued)

OTHER PUBLICATIONS

C3-180334 Huawei, "Group Message Delivery API via MBMS," 3GPP TSG-CT WG3 Meeting #94, Gothenburg, Sweden, Jan. 22-26, 2018, 16 pages.

(Continued)

*Primary Examiner* — Iqbal Zaidi
(74) *Attorney, Agent, or Firm* — Conley Rose, P.C.

(57) ABSTRACT

A communication method, a communications apparatus, and a communications system, where the method includes: a first network element receiving identity information of a terminal from a second network element, where the identity information includes an identity of the terminal or an identity of a group of the terminal; the first network element obtaining, based on the identity information, type information of a serving network corresponding to the identity information; and the first network element sending API information of the first network element based on the type information. Based on this method, the second network element can select an available API based on the API information or the type (Continued)

information of the serving network and invoke the available API.

20 Claims, 16 Drawing Sheets

(56) References Cited

U.S. PATENT DOCUMENTS

| | | | |
|---|---|---|---|
| 2017/0199751 A1* | 7/2017 | Sama | H04W 40/24 |
| 2017/0265063 A1 | 9/2017 | Xie et al. | |
| 2018/0084402 A1 | 3/2018 | Kunz et al. | |
| 2019/0141486 A1* | 5/2019 | Lu | H04W 72/005 |
| 2019/0327577 A1 | 10/2019 | Mohamed et al. | |

FOREIGN PATENT DOCUMENTS

| | | |
|---|---|---|
| CN | 105491557 A | 4/2016 |
| CN | 106211137 A | 12/2016 |
| JP | 2018032897 A | 3/2018 |
| WO | 2015025404 A1 | 2/2015 |
| WO | 2017004158 A1 | 1/2017 |
| WO | 2017113109 A1 | 7/2017 |

OTHER PUBLICATIONS

S2-183453, Huawei, "Solution for KI#9 common north-bound APIs for EPC-5GC interworking," SA WG2 Meeting #127, Apr. 16-20, 2018, Sanya, China, 6 pages.

S2-185115, Huawei, "Resolve the editors notes in Solution 14," 3GPP TSG-SA WG2 Meeting #127 Bis, May 28-Jun. 1, 2018, Newport Beach, USA, 8 pages.

S2-1901274, Huawei, "Procedures for solution 14 to key issue 9," 3GPP TSG-SA WG2 Meeting #130, Jan. 21-25, 2019, Kochi, India, 7 pages.

3GPP TR 23 724 V0.2.0 (Mar. 2018), "3rd Generation Partnership Project; Technical Specification Group Services and System Aspects; Study on Cellular IoT support and evolutionfor the 5G System (Release 16)," 64 pages.

3GPP TS 23.222 V15.1.0 (Apr. 2018), "3rd Generation Partnership Project; Technical Specification Group Services and System Aspects; Functional architecture and information flows to support Common API Framework for 3GPP Northbound APIs; Stage 2 (Release 15)," 87 pages.

3GPP TS 23.501 V15.1.0 (Mar. 2018), "3rd Generation Partnership Project; Technical Specification Group Services and System Aspects; System Architecture for the 5G System; Stage 2 (Release 15)," 201 pages.

3GPP TS 23.502 V15.1.0 (Mar. 2018), "3rd Generation Partnership Project; Technical Specification Group Services and System Aspects;Procedures for the 5G System; Stage 2(Release 15)," 285 pages.

Convida Wireless LLC et al.,"Key Issue on Support of common north-bound APIs for EPC-5GC Interworking," SA WG2 Meeting #125, S2-180429, Gothenburg, Sweden, Jan. 22-26, 2018, 2 pages.

Convida Wireless LLC et al., "Key Issue on Support of equivalent overall functionalities as provided by SCEF for CIoT/MTC," SA WG2 Meeting #125, S2-180431, Gothenburg, Sweden, Jan. 22-26, 2019, 3 pages.

* cited by examiner

COMMUNICATION METHOD, COMMUNICATIONS APPARATUS, AND COMMUNICATIONS SYSTEM

CROSS-REFERENCE TO RELATED APPLICATIONS

This application is a continuation of International Patent Application No. PCT/CN2019/078598, filed on Mar. 19, 2019, which claims priority to Chinese Patent Application No. 201810313229.9, filed on Apr. 9, 2018. The disclosures of the aforementioned applications are hereby incorporated by reference in their entireties.

TECHNICAL FIELD

This application relates to communications technologies, and in particular, to a communication method, a communications apparatus, and a communications system.

BACKGROUND

Explosive development of new services such as Internet of Vehicles, mobile office, and the Internet of Things impose higher requirements on communications networks with respect to an access speed, traffic density, and other factors. Driven by various types of new services, networks using different access technologies emerge, for example, $4^{th}$ generation (4G) networks and $5^{th}$ generation (5G) networks. All of the networks using the different access technologies can expose network functions to third-party applications through application programming interfaces (APIs), and the third-party applications use the APIs to obtain terminal related services.

Because a terminal can support all different access technologies such as a 4G access technology and a 5G access technology, the terminal can flexibly switch between a 4G network and a 5G network. However, when the terminal switches between the 4G network and the 5G network, a third-party application cannot learn the network in which the terminal is currently located, and therefore cannot learn an API that can be currently invoked. As a result, an API invoke success rate is low, and user experience is poor.

SUMMARY

This application provides a communication method, a communications apparatus, and a communications system, in order to avoid an API invoke error, ensure an API invoke success rate, and improve user experience.

A first aspect of this application provides a communication method, applied to a first network element, where the method includes: receiving, by the first network element, identity information of a terminal from a second network element, where the identity information includes an identity of the terminal or an identity of a group of the terminal; obtaining, by the first network element based on the identity information, type information of a serving network corresponding to the identity information; and sending, by the first network element, API information of the first network element based on the type information.

In this method, after receiving the identity information of the terminal that is sent by the second network element, the first network element obtains the type information of the serving network corresponding to the identity information, and sends the API information or the type information of the serving network to the second network element based on the type information of the serving network. As such, the second network element can select an available API based on the API information or the type information of the serving network and invoke the available API, thereby avoiding an API invoke error, ensuring an API invoke success rate, and improving user experience.

In a possible design, the type information includes a type of the serving network or indication information used to indicate that a type of the serving network changes.

In a possible design, the identity information is included in a first message, and the API information is included in a second message.

In a possible design, the first message is used to subscribe to an API support capability, and the second message is used to notify the API support capability. Alternatively, the first message is used to query an API support capability, and the second message is used to respond to the first message.

In a possible design, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

In a possible design, the first message is an API support capability subscription message.

In a possible design, the type information is included in the second message, and the second message is used to notify the API support capability.

In a possible design, the second message is an API support capability notification message, and the API support capability notification message includes the identity of the terminal or the identity of the group.

In a possible design, the first message is a first event subscription message or a first monitoring request message, and the first event subscription message or the first monitoring request message includes an identity of an API support capability change event.

In a possible design, the second message is a first event notification message or a first monitoring response message, and the first event notification message or the first monitoring response message includes the identity of the terminal or the identity of the group.

In a possible design, the first message is an API support capability query message, and the second message is an API support capability response message.

In a possible design, the obtaining, by the first network element based on the identity information, type information of a serving network corresponding to the identity information includes: sending, by the first network element, a third message to a third network element, where the third message is used to request the type information; and receiving, by the first network element, the type information from the third network element.

In a possible design, the first message is an API invoke message, and the API invoke message includes the identity of the terminal or the identity of the group.

In a possible design, the first message is a second event subscription message or a second monitoring request message, and the second event subscription message or the second monitoring request message includes an identity of a serving network type change event.

In a possible design, the first message is a terminal-register-with-network request message.

In a possible design, the method further includes sending, by the first network element, the type information.

A second aspect of this application provides a communication method, applied to a second network element, where the method includes: sending, by the second network element, identity information of a terminal to a first network element, where the identity information includes an identity of the terminal or an identity of a group of the terminal; receiving, by the second network element, API information of the first network element from the first network element; and invoking, by the second network element, an API based on the API information.

In a possible design, the identity information is included in a first message, and the API information is included in a second message.

In a possible design, the first message is used to subscribe to an API support capability, and the second message is used to notify the API support capability. Alternatively, the first message is used to query an API support capability, and the second message is used to respond to the first message.

In a possible design, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

In a possible design, the sending, by the second network element, identity information of a terminal to a first network element includes: when the second network element triggers to invoke an API according to a service requirement, sending the identity information of the terminal to the first network element; when a preset timer expires, sending the identity information of the terminal to the first network element; or when the second network element receives, from the first network element, the indication information used to indicate that the API support capability changes, sending the identity information of the terminal to the first network element.

A third aspect of this application provides a communication method, applied to a first network element, where the method includes: sending, by the first network element, a third message to a third network element, where the third message is used to request type information of a serving network of a terminal or a group of a terminal; receiving, by the first network element, the type information from the third network element; and sending, by the first network element, API information of the first network element based on the type information.

In this method, the first network element sends the third message to the third network element, to request the type information of the serving network of the terminal or the group of the terminal. Additionally, the third network element obtains, based on the third message, the type information of the serving network of the terminal or the group of the terminal, and sends the type information to the first network element. As such, the first network element can obtain the type information of the serving network, and send the API information of the first network element or the type information of the serving network to the second network element, and then the second network element can invoke an available API based on the API information or the type information of the serving network, thereby avoiding an API invoke error, ensuring an API invoke success rate, and improving user experience.

In a possible design, the type information includes a type of the serving network or indication information used to indicate that a type of the serving network changes.

In a possible design, the type information is included in a fourth message. Additionally, the third message is a subscription message used to subscribe to the type of the serving network, and the fourth message is a notification message. Alternatively, the third message is a query message used to query the type of the serving network, and the fourth message is a response message for the third message.

In a possible design, when the third message is used to request the type information of the serving network of the terminal, the third message includes an identity of the terminal. Alternatively, when the third message is used to request the type information of the serving network of the group of the terminal, the third message includes an identity of a group of the terminal.

In a possible design, the third message is a third event subscription message or a third monitoring request message, and the third event subscription message or the third monitoring request message includes an identity of a serving network type change event.

In a possible design, the fourth message is a third event notification message or a third monitoring response message, and the third event notification message or the third monitoring response message includes a serving network type change indication or the type of the serving network, and further includes the identity of the terminal or the identity of the group.

In a possible design, the third message is a terminal-register-with-network request message.

In a possible design, the fourth message is a terminal-register-with-network response message, and the terminal-register-with-network response message includes the type of the serving network, and further includes the identity of the terminal or the identity of the group.

In a possible design, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

In a possible design, the third network element is a network element integrating a home subscriber server (HSS) and uniform data management (UDM); or the third network element is a network element integrating a policy control function (PCF) and a policy and charging rules function (PCRF); or the third network element is a mobility management entity (MME); or the third network element is an access and mobility management function (AMF).

A fourth aspect of this application provides a communication method, applied to a third network element, where the method includes: receiving, by the third network element, a third message from a first network element, where the third message is used to request type information of a serving network of a terminal or a group of a terminal; and sending, by the third network element, the type information based on the third message.

In a possible design, the type information includes a type of the serving network or indication information used to indicate that a type of the serving network changes.

In a possible design, the type information is included in a fourth message. Additionally, the third message is a subscription message used to subscribe to the type of the serving network, and the fourth message is a notification message. Alternatively, the third message is a query message used to query the type of the serving network, and the fourth message is a response message for the third message.

In a possible design, the sending, by the third network element, the type information based on the third message includes sending, when detecting that the type of the serving network changes, the information used to indicate the type of the serving network.

In a possible design, the sending, by the third network element, the type information based on the third message includes: querying, by the third network element, the type of the serving network based on the third message; and sending, by the third network element, the type of the serving network.

In a possible design, the third network element is a network element integrating a home subscriber server (HSS) and uniform data management (UDM); or the third network element is a network element integrating a policy control function (PCF) and a policy and charging rules function (PCRF); or the third network element is a mobility management entity (MME); or the third network element is an access and mobility management function (AMF).

In a possible design, when the third message is used to request the type information of the serving network of the terminal, the third message includes an identity of the terminal. Alternatively, when the third message is used to request the type information of the serving network of the group of the terminal, the third message includes an identity of a group of the terminal.

A fifth aspect of this application provides a communications apparatus. The communications apparatus is configured to implement functions of the first network element in the first aspect. These functions may be implemented by hardware, or may be implemented by hardware executing corresponding software. The hardware or software includes one or more modules corresponding to the foregoing functions.

In a possible design, the communications apparatus may include a receiving module, a processing module, and a sending module. The receiving module, the processing module, and the sending module may perform corresponding functions in the foregoing method. For example, the receiving module is configured to receive identity information of a terminal from a second network element, where the identity information includes an identity of the terminal or an identity of a group of the terminal. The processing module is configured to obtain, based on the identity information, type information of a serving network corresponding to the identity information. The sending module is configured to send API information of the first network element based on the type information.

A sixth aspect of this application provides a communications apparatus. The communications apparatus is configured to implement functions of the second network element in the second aspect. These functions may be implemented by hardware, or may be implemented by hardware executing corresponding software. The hardware or software includes one or more modules corresponding to the foregoing functions.

In a possible design, the communications apparatus may include a receiving module, a processing module, and a sending module. The receiving module, the processing module, and the sending module may perform corresponding functions in the foregoing method. For example, the sending module is configured to send identity information of a terminal to a first network element, where the identity information includes an identity of the terminal or an identity of a group of the terminal. The receiving module is configured to receive, from the first network element, API information of the first network element. The processing module is configured to invoke an API based on the API information.

A seventh aspect of this application provides a communications apparatus. The communications apparatus is configured to implement functions of the first network element in the third aspect. These functions may be implemented by hardware, or may be implemented by hardware executing corresponding software. The hardware or software includes one or more modules corresponding to the foregoing functions.

In a possible design, the communications apparatus may include a receiving module, a processing module, and a sending module. The receiving module, the processing module, and the sending module may perform corresponding functions in the foregoing method. For example, the sending module is configured to send a third message to a third network element, where the third message is used to request type information of a serving network of a terminal or a group of a terminal. The receiving module is configured to receive the type information from the third network element, and the processing module is configured to send API information of the first network element based on the type information using the sending module.

An eighth aspect of this application provides a communications apparatus. The communications apparatus is configured to implement functions of the third network element in the fourth aspect. These functions may be implemented by hardware, or may be implemented by hardware executing corresponding software. The hardware or software includes one or more modules corresponding to the foregoing functions.

In a possible design, the communications apparatus may include a receiving module, a processing module, and a sending module. The receiving module, the processing module, and the sending module may perform corresponding functions in the foregoing method. For example, the receiving module is configured to receive a third message from a first network element, where the third message is used to request type information of a serving network of a terminal or a group of a terminal. The processing module is configured to send, based on the third message, the type information using the sending module.

A ninth aspect of this application provides a communications apparatus. The communications apparatus includes a memory and a processor. The memory is configured to store a program instruction, and the processor is configured to perform the program instruction in the memory, to implement the method in the first aspect.

A tenth aspect of this application provides a communications apparatus. The communications apparatus includes a memory and a processor. The memory is configured to store a program instruction, and the processor is configured to perform the program instruction in the memory, to implement the method in the second aspect.

An eleventh aspect of this application provides a communications apparatus. The communications apparatus includes a memory and a processor. The memory is configured to store a program instruction, and the processor is configured to perform the program instruction in the memory, to implement the method in the third aspect.

A twelfth aspect of this application provides a communications apparatus. The communications apparatus includes a memory and a processor. The memory is configured to store a program instruction, and the processor is configured to perform the program instruction in the memory, to implement the method in the fourth aspect.

A thirteenth aspect of this application provides a communications system. The communications system includes the communications apparatus according to the ninth aspect, the communications apparatus according to the tenth aspect, the communications apparatus according to the eleventh aspect, and the communications apparatus according to the twelfth aspect.

A fourteenth aspect of this application provides a computer readable storage medium. The computer storage medium stores a computer program, and the computer program includes instructions used to perform the method according to the first aspect.

A fifteenth aspect of this application provides a computer readable storage medium. The computer storage medium stores a computer program, and the computer program includes instructions used to perform the method according to the second aspect.

A sixteenth aspect of this application provides a computer readable storage medium. The computer storage medium stores a computer program, and the computer program includes instructions used to perform the method according to the third aspect.

A seventeenth aspect of this application provides a computer readable storage medium. The computer storage medium stores a computer program, and the computer program includes instructions used to perform the method according to the fourth aspect.

An eighteenth aspect of this application provides a computer product. The computer product includes computer program code, and when the computer program code is executed, the method according to the first aspect is performed.

A nineteenth aspect of this application provides a computer product. The computer product includes computer program code, and when the computer program code is executed, the method according to the second aspect is performed.

A twentieth aspect of this application provides a computer product. The computer product includes computer program code, and when the computer program code is executed, the method according to the third aspect is performed.

A twenty-first aspect of this application provides a computer product. The computer product includes computer program code, and when the computer program code is executed, the method according to the fourth aspect is performed.

DESCRIPTION OF EMBODIMENTS

To make persons skilled in the art better understand the technical solutions of this application, the following first describes an architecture of a network using different access technologies. An Evolved Packet System (EPS), namely, a 4G network, and a 5G network architecture are used as an example for description.

Figure 1:
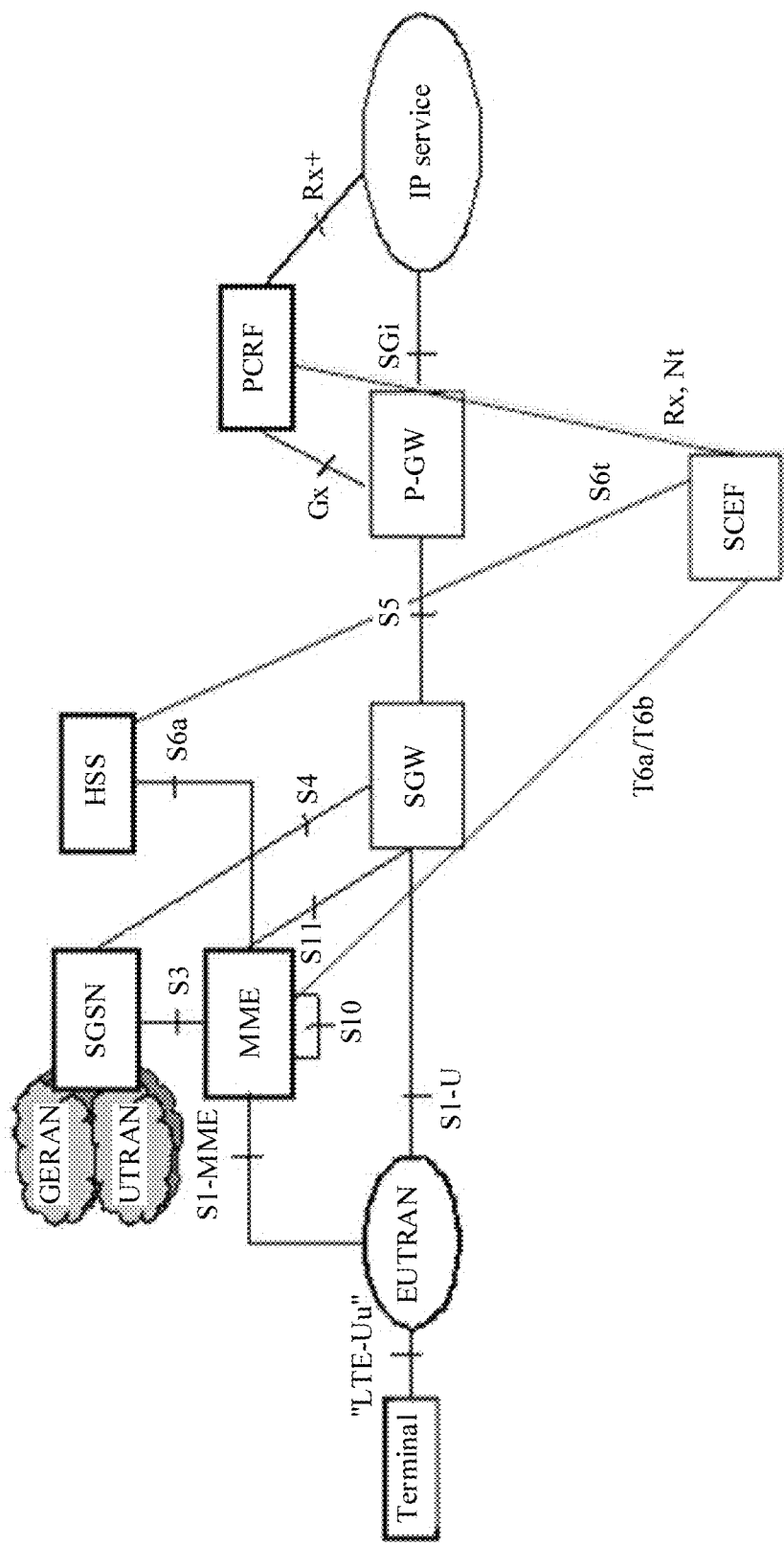
FIG. 1 is a schematic diagram of a network architecture of an evolved packet system (EPS)

FIG. 1 is a schematic diagram of a network architecture of an EPS. As shown in FIG. 1, the EPS mainly includes network entities such as an Evolved Universal Terrestrial Radio Access Network (EUTRAN), a mobility management entity (MME), a serving gateway (SGW), a packet data network gateway (P-GW), a serving General Packet Radio Service (GPRS) support node (SGSN), a home subscriber server (HSS), and a policy and charging rules function (PCRF). Functions of the network entities are as follows.

The EUTRAN is a network including a plurality of evolved NodeBs (eNodeBs), and implements a radio physical layer function, resource scheduling and radio resource management, radio access control, and mobility management. An eNodeB is connected to the SGW through a user plane interface S1-U, is connected to the MME through a control plane interface S1-MME, and implements functions such as radio access bearer control using an S1-AP protocol.

The MME is mainly responsible for all control plane functions of user session management, including non-access stratum (NAS) signaling and security, tracking area list management, P-GW and SGW selection, and the like.

The SGW is mainly responsible for data transmission and forwarding, route switching, and the like of a terminal, and is used as a local mobility anchor when the terminal switches between the eNodeBs (each terminal is served by only one SGW at a time).

The P-GW is used as an anchor for connecting to a packet data network (PDN), and is responsible for Internet Protocol (IP) address allocation, data packet filtering, rate control, charging information generation, and the like of the terminal.

The SGSN is an access point in a $2^{nd}$ generation (2G) access network, namely, a Global System for Mobile Communications (GSM) or Enhanced Data Rates for GSM Evolution (EDGE) radio access network (GERAN), in a $3^{rd}$ generation (3G) access network, namely, a universal terrestrial radio access network (UTRAN), or in an EPS core network, namely, an evolved packet core (EPC), and is responsible for bearer establishment and data forwarding from the GERAN to the EPC and from the UTRAN to the EPC.

The HSS stores subscription data of a mobile subscriber.

The PCRF is responsible for charging management and policy control, including a policy and charging control (PCC) rule and a quality of service (QoS) rule.

A service capability exposure function (SCEF) is responsible for providing a network function for a third party, for example, receiving a terminal related parameter from a third-party application or subscribing to a terminal related event.

Figure 2:
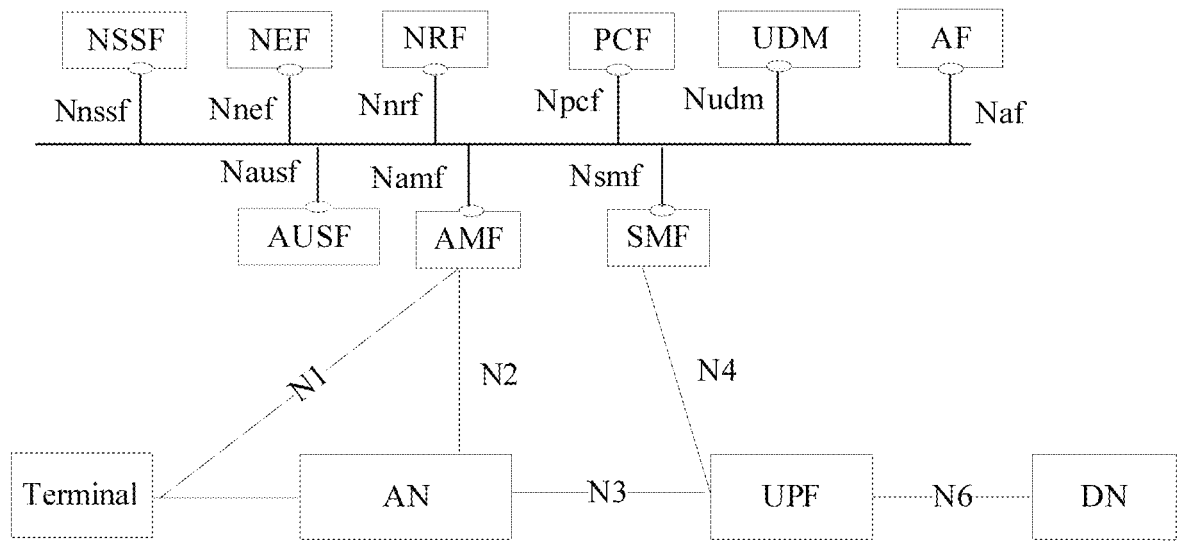
FIG. 2 is a schematic architectural diagram of a 5G network.

FIG. 2 is a schematic architectural diagram of a 5G network. As shown in FIG. 2, the 5G network includes a terminal, an access network (AN), a core network, and a data network (DN). Functions of the network entities are as follows.

The terminal is an ingress for interaction between a mobile subscriber and a network, and is capable of providing a basic computing capability and a storage capability, displaying a service window to a user, and receiving an input operated by a user. The terminal in the 5G network uses a next generation air interface technology to establish a signal connection and a data connection to the AN, in order to transmit a control signal and service data to a mobile network.

The AN, similar to a base station in a conventional network, is deployed at a position close to the terminal, provides a network access function for an authorized user in a specific area, and is capable of using, based on a user level, a service requirement, and the like, transport tunnels of different quality to transmit user data. The AN is capable of managing resources of the AN, using the resources in appropriately, providing an access service for the terminal according to a requirement, and forwarding the control signal and the user data between the terminal and the core network.

The DN is a data network proving a business service for the user. Usually, a client is located in the terminal, and a server is located in the data network. The data network may be a private network such as a local area network, may be an external network that is not managed and controlled by an operator, such as the Internet, or may be a special-purpose network deployed by all operators.

The core network is responsible for maintaining subscription data of the mobile network, managing network elements in the mobile network, and providing functions such as session management, mobility management, policy management, and security authentication for the terminal. When the terminal needs to attach to the core network, the core network provides network access authentication for the terminal; when the terminal has a service request, the core network allocates a network resource to the terminal; when the terminal moves, the core network updates a network resource for the terminal; when the terminal is idle, the core network provides a fast recovery mechanism for the terminal; when the network is detached from the core network, the core network releases a network resource for the terminal; or when the terminal has service data, the core network provides a data routing function for the terminal, for example, forwarding uplink data to the DN; or receiving downlink data of the terminal from the DN, forwarding the downlink data to the AN, to send the downlink data to the terminal.

The core network may be divided into a user plane and a control plane. The user plane includes a user plane function (UPF), and the control plane may include an authentication server function (AUSF), an access and mobility management function (AMF), a session management function (SMF), a network slice selection function (NSSF), a network exposure function (NEF), a network function repository function (NRF), unified data management (UDM), a policy control function (PCF), an application function (AF), and the like. Functions of the network entities are as follows.

The UPF forwards a user data packet according to a routing rule of the SMF.

The AUSF performs security authentication of the terminal.

The AMF performs access management and mobility management of the terminal.

The SMF performs session management of the terminal.

The NSSF selects a network slice for the terminal.

The NEF exposes a network function to a third party through an API.

The NRF stores and selects network function entity information for another network element.

The UDM performs user subscription context management.

The PCF performs user policy management.

The AF performs user application management.

It can be learned from the network architectures of the 4G network and the 5G network that the SCEF and the NEF are capability exposure network elements in the 4G network and the 5G network, respectively, and are responsible for exposing network functions to a third party.

Figure 3:
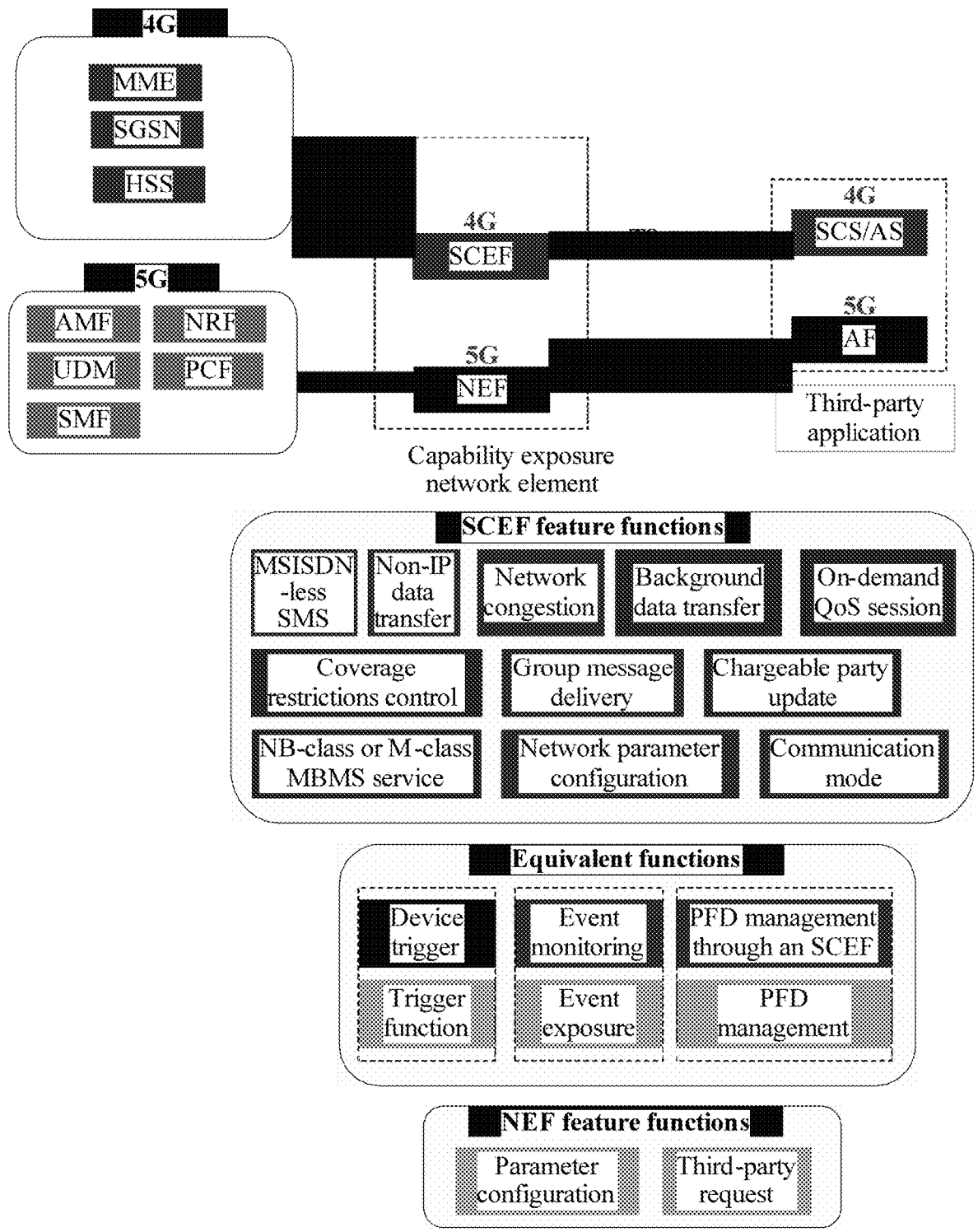
FIG. 3 is a schematic diagram of function support of a capability exposure network element.

FIG. 3 is a schematic diagram of function support of a capability exposure network element. As shown in FIG. 3, a third-party application interacts with an SCEF through a T8 interface to call an EPS network service, and interacts with an NEF through an Nnef interface to call a 5G network service. Some of functions supported by the T8 interface and the Nnef interface are the same, and some of the functions are different. For example, the T8 interface and the Nnef interface can support same functions with different interface names, which are referred to as equivalent functions. For example, a device trigger module and a trigger service module in FIG. 3 implement same functions in a 4G network and a 5G network. The T8 interface and the Nnef interface can also provide feature functions, which are referred to as SCEF feature functions (for example, a numberless short message service (SMS) module implemented only in the 4G network) and NEF feature functions (for example, a third-party request module implemented only in the 5G network). These feature functions are not supported by other systems.

There are the following problems when network capability exposure is implemented in an existing network.

When a terminal supports access to both a 4G network and a 5G network, the terminal may switch between the 4G network and the 5G network or register with the 4G network or the 5G network. It can be learned from FIG. 3 that when the terminal registers with different networks, the networks can expose different capabilities to the terminal. For example, if the terminal currently registers with an EPS network, a third-party application can invoke only APIs related to an equivalent function and an SCEF feature function, and has an error when invoking another API. Alternatively, if the terminal registers with the 5G network, a third-party application can invoke only APIs related to an equivalent function and an NEF feature function, and has an error when invoking another API.

However, in other approaches, when a terminal switches between a 4G network and a 5G network or registers with the 4G network or the 5G network, a third-party application cannot learn a network in which the terminal is currently located, and then cannot learn an API that can be currently invoked. As a result, an API invoke error may be caused.

The technical solutions provided in this application aim to resolve the foregoing problems.

Figure 4:
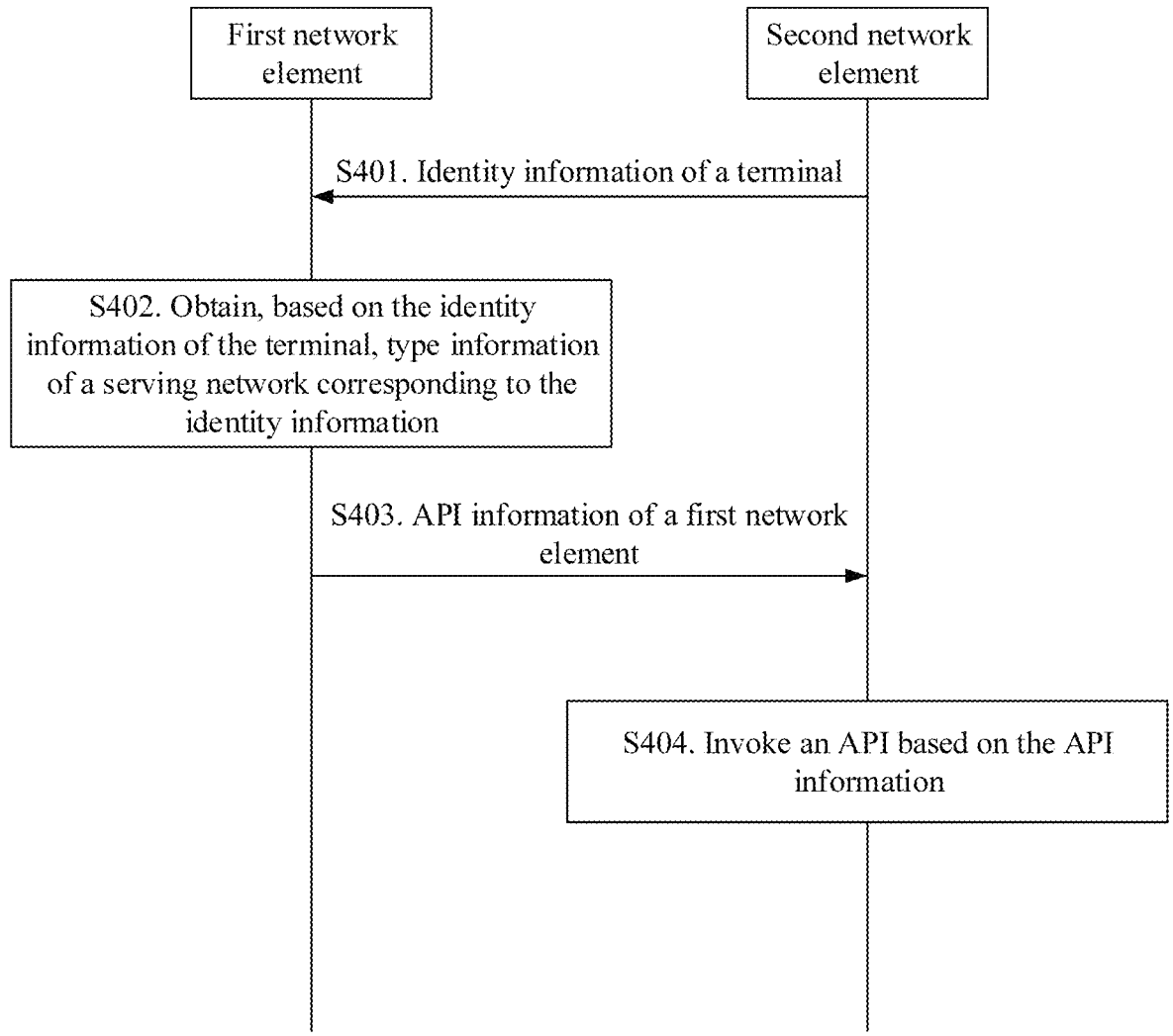
FIG. 4 is an interaction flowchart of a communication method according to this application.

FIG. 4 is an interaction flowchart of a communication method according to this application. As shown in FIG. 4, an interaction process of the method is as follows.

S401. A second network element sends identity information of a terminal to a first network element.

The identity information may include an identity of the terminal or an identity of a group of the terminal. The identity of the terminal may identify the terminal. For example, the identity may be an identification of the terminal (for example, an international mobile subscriber identity (IMSI), a general public subscription identifier (GPSI), a mobile subscriber integrated services digital network (ISDN) number (MSISDN), or an External ID). The identity of the group may identify a group of the terminal. For example, the identity of the group may be a group identification of the terminal (for example, an IMSI Group ID or an External Group ID).

The group of the terminal may be a group to which the terminal belongs or in which the terminal is located, and the group may include one or more terminals. The group of the terminal may be determined by subscription data of the terminal, and may be obtained from the subscription data of the terminal.

Optionally, the second network element may be an AF (namely, a third-party application), a service capability server (SCS), or an application server (AS). The first network element may be a capability exposure network element. For example, the first network element may be an SCEF, an NEF, or an SCEF-NEF integrated network element.

The SCEF-NEF integrated network element means that physical deployment positions of the SCEF and the NEF are on a same product or server. An interface between the SCEF and the NEF is a private interface, and interaction between the SCEF and the NEF does not need to be standardized.

Optionally, the second network element sends the identity information of the terminal using a first message, and the first message may be used to request to obtain type information of a serving network corresponding to the identity information.

In an optional implementation, the first message is a subscription message. For example, the first message may be used to subscribe to an API support capability. After the API support capability is subscribed to using the first message, when the API support capability of the first network element changes, the first network element may proactively notify the second network element that the API support capability of the first network element changes.

The API support capability of the first network element is a valid API (or service) provided by the first network element for a specific terminal or a specific group of a terminal. A relationship between the "API" and the "service" is: The "service" is functions that can be provided by the first network element, and the "API" is a means of implementing these functions.

In an example, the first message is an API support capability subscription message, and the API support capability subscription message includes the identity information of the terminal. Further, the API support capability subscription message may include an AF API capability, a callback uniform resource identifier (URI), and the like.

The AF API capability is used to indicate an API supported by the AF. The uniform resource identifier is used by the first network element to address a callback address. When the API support capability of the first network element changes, the first network element may proactively notify the callback address.

In another example, the first message is a first event subscription message or a first monitoring request message. The first message includes an identity of an API support capability change event and the identity information of the terminal. The first network element supports the API support capability change event, and the API support capability change event may be identified by APISupportCapability Change. After receiving the identity of the API support capability change event, the first network element may start to detect the API support capability change event. A process is described in Embodiment 5 below.

Optionally, the first message further includes an AF API capability, a callback URI, and the like.

It should be noted that if the first message includes the callback URI, when sending a second message corresponding to the first message, the first network element may send the second message to an address identified by the callback URI. In the following embodiments, same processing is performed when the callback URI is used. No description is further provided.

In another optional implementation, the first message is a query message. For example, the first message is used to query an API support capability.

For example, the first message is an API support capability query message, and the API support capability query message includes the identity information of the terminal. Further, the API support capability query message may further include an AF API capability.

Optionally, the second network element may perform step S401 in any one of the following cases, that is, the second network element is triggered to send the identity information of the terminal to the first network element.

Case 1: The second network element triggers to invoke an API according to a service requirement.

For example, when invoking an API according to the service requirement, the second network element may send the identity information of the terminal to the first network element before invoking the API, to obtain API information of the first network element.

For example, a third network element is an Internet of Vehicles server, and needs to obtain position information of the terminal. In this case, the third network element triggers to invoke a position API, sends the identity of the terminal to the first network element, and then determines, based on the API information returned by the first network element, a specific position API to be invoked.

Case 2: A preset timer expires.

Case 3: The second network element receives, from the first network element, indication information used to indicate that the API support capability changes.

When the second network element receives, from the first network element, the indication information used to indicate that the API support capability changes, it indicates that the API support capability of the first network element changes. Then, the second network element may send the first message to the first network element, to obtain a latest API supported by the first network element.

S402. The first network element obtains, based on the identity information of the terminal, type information of a serving network corresponding to the identity information.

The serving network may be a network that provides a service for the terminal or the group of the terminal. The serving network may be a network with which the terminal or a terminal in the group of the terminal currently registers. For example, for a terminal in a dual registration mode, two networks simultaneously serve the terminal, and both the two networks are networks serving the terminal. If some terminals in the group of the terminal register with a network, and other terminals register with another network, both the two networks are networks serving the group of the terminal. When all registered terminals in the group of the terminal register with one network, the network with which the terminals register is the serving network of the group of the terminal.

Further, the serving network corresponding to the identity information may be a network that provides a service for the terminal or the group of the terminal that is identified by the identity information.

The type information of the serving network may include a type of the serving network, or indication information used to indicate that a type of the serving network changes.

For example, the type of the serving network may be a type of a 3$^{rd}$ Generation Partnership Project (3GPP) core network such as an Evolved Packet Core (EPC) network, a 5G core network (5GC), an EPC/5GC, BOTH, a Non-5GC, 5G, 4G, 3G, or Non-5G, or a combination thereof; or may be a 3GPP radio access technology (RAT) such as UTRAN, CDMA2000, GERAN, Long-Term Evolution (LTE), new radio (NR), E-UTRAN, or next generation (NG)-RAN (NG-RAN), or the like. The EPC/5GC means that both the EPC and the 5GC serve the terminal or the group of the terminal in some cases (for example, in the dual registration mode, or when some terminals in the group of the terminal are located in the EPC and some terminals are located in the 5GC). The indication information used to indicate that the type of the serving network changes may be indication information obtained when the type of the serving network corresponding to the identity information changes. When obtaining the indication information, the first network element may determine that the type of the serving network corresponding to the identity information changes.

In an implementation, the first network element selects, based on the received first message, a corresponding manner to obtain the type information. For example, if the first message is a subscription message, the first network element subscribes to an event from the third network element. Alternatively, if the first message is a query message, the first network element sends a query message to the third network element, to query a network type. For a process, refer to the following embodiments of interactions between the first network element and the third network element. Details are not described.

S403. The first network element sends API information of the first network element based on the type information.

Correspondingly, the second network element receives the API information from the first network element.

The API information of the first network element is used to indicate the API support capability of the first network element. The second network element may determine the API support capability of the first network element based on the API information. The API information may be an API Indication.

For example, when obtaining the type information, the first network element may determine the serving network of the terminal or the group of the terminal that is identified by the identity information, and the first network element may further send the API information corresponding to the serving network to the second network element. For example, if the terminal is currently located in the EPC network, 4G APIs are used as available APIs, and the first network element sends information about the available APIs to the second network element. Further, when the first message includes the AF API capability, the first network element selects, from the available APIs based on the AF API capability, an API supported by the AF, and sends information about the selected API to the second network element.

Optionally, the first network element sends the API information of the first network element using the second message. The API information of the first network element may be used to indicate an API state of the first network element.

In an optional implementation, the API information of the first network element may be API state information. The API state information may include at least one of the following information: the indication information used to indicate that the API support capability changes, a list of available API(s), a list of unavailable API(s), or a list of API state(s).

The indication information used to indicate that the API support capability changes is used to indicate that the API support capability of the first network element changes. Further, after receiving the indication information, the second network element may send a request message to the first network element, to obtain change content of the API support capability of the first network element.

The list of available API(s) includes an API currently supported by the first network element.

The list of unavailable API(s) includes an API currently not supported by the first network element.

The list of API state(s) includes all APIs of the first network element. For example, the list of API state(s) includes identities of all the APIs and states corresponding to all the APIs. The state corresponding to an API may be available or unavailable, or may be a suspended state or a running state, or may be a level of support. An identity of an API can identify the API.

For example, a list of API state(s) includes two records: A first record is an API1 is available; and a second record is an API2 is unavailable. In this case, after receiving the list of API state(s), the second network element may determine that the API1 can be invoked while the API2 cannot be invoked currently.

The suspended state means that a function corresponding to the API cannot be provided for the terminal, and the running state means that a function corresponding to the API can be provided normally.

For example, a list of API state(s) includes two records: A first record is an API1 is in a suspended state; and a second record is an API2 is in a running state. In this case, after receiving the list of API state(s), the second network element may determine that the API2 can be invoked while the API1 cannot be invoked currently.

There may be a plurality of levels of support, and one level corresponds to one network type.

For example, it is assumed that a level 1 corresponds to a 5G network, and a level 2 corresponds to a 4G network. If the list of API state(s) includes the level 1, when the second network element invokes an API from the first network element, information about the level 1 is carried, and the first network element selects an API in a 5G network for the second network element based on the level 1.

For example, each API identity in the list of API state(s) corresponds to one API state, and the API state is used to indicate a state of an identified API. For example, the list of API state(s) includes an API identity API1, and an API corresponding to the API1 is in an available state. In this case, it indicates that the API identified by the API1 is available currently. After receiving the information, the second network element may invoke the API1 according to a requirement.

Corresponding to the first message, the second message may be in the following two manners.

Manner 1. When the first message is used to subscribe to the API support capability, the second message is used to notify the API support capability.

In an example, the second message is an API support capability notification message, and the API support capability notification message includes the API information, and further includes the identity information of the terminal.

In another example, the second message is a first event notification message or a first monitoring response message, and the first event notification message or the first monitoring response message includes the identity information of the terminal.

Manner 2. When the first message is used to query the API support capability, the second message is used to respond to the first message.

For example, the second message is an API support capability response message, and the API support capability response message includes the API information.

In another optional implementation, the API information of the first network element may be alternatively an API invoke result.

In this implementation, the first message may be an API invoke message, and correspondingly, the second message may be an API invoke response message.

For example, the second network element sends the API invoke message to the first network element, where the API invoke message is used to invoke a specific API. After receiving the API invoke message, the first network element is configured to: obtain the type information of the serving network; determine, based on the type information of the serving network, whether the API that the second network element requests to invoke is available; and send the second message to the second network element, where the second message includes an invoke result of the API.

The API invoke result may be an invoke failure. If the invoke result is an invoke failure, the second message includes an error code. The error code may indicate that a cause for the API invoke failure is: A network never supports the API invoke, or a network does not support the API invoke temporarily. If the error code indicates that the network does not support the API invoke temporarily, the second message may additionally include a timer value, and the second network element may set a timer based on the timer value, and send the first message again after the timer expires.

S404. The second network element invokes an API based on the API information.

Optionally, the second network element selects an available API based on the API information and invokes the selected API.

For example, it is assumed that the API information is the list of available API(s), and the list includes identities of the API1, the API2, and an API3. When receiving the API information, the second network element may learn that the API1, the API2, and the API3 are available. Then, the second network element selects the API2 and the API3 according to the service requirement and invokes the API2 and the API3. Assuming that the API1 is a position API, and an application in the second network element needs to use the position information of the terminal, the second network element may select the API1 from the available API1, API2, and API3, and send an API1 invoke request to the first network element. It should be noted that in an alternative implementation, the API information sent by the first network element to the second network element in step S403 may be replaced with the type information of the serving network.

Further, in step S404, the second network element invokes an API based on the type information of the serving network.

In this implementation, the first message sent by the second network element to the first network element in step S401 may be in the following two manners.

Manner 1: Subscription Message

In an example, the first message may be a second event subscription message or a second monitoring request message. The first message includes an identity of a serving network type change event, and further includes the identity information of the terminal. The first network element supports the serving network type change event, and the serving network type change event may be identified by CN Type Change. After receiving the identity of the serving network type change event, the first network element may start to detect the serving network type change event. A process is described in Embodiment 8 below.

Optionally, the first message may further include an AF API capability, a callback URI, and the like.

After receiving the first message, the first network element detects the serving network type change event of the terminal. If the event is triggered, the first network element sends the second message. The second message is a second event notification message or a second monitoring response message, the second message includes a serving network type change indication or the type of the serving network, and the second message further includes the identity of the terminal or the group of the group. The serving network type change indication may be a CN Type Change Indication.

After receiving the second message, the second network element selects an available API based on the serving network type change indication or the type of the serving network and invokes the available API.

For example, if the second message received by the second network element includes the serving network type change indication, the second network element may determine that the serving network of the terminal changes. Considering that the second network element stores that a network in which the terminal is located before the serving network changes is the 4G network, the second network element may determine that the terminal has switched to the 5G network, and the second network element may select and invoke an API in the 5G network.

Manner 2: Query Message

Optionally, the first message may be a terminal-register-with-network request message, and the terminal-register-with-network request message includes the identity of the terminal or the identity of the group. The second message is a terminal-register-with-network response message.

After receiving the first message, the first network element queries the third network element about the type of the serving network.

After obtaining the network type, the first network element sends the terminal-register-with-network response message to the second network element, where the terminal-register-with-network response message includes the type of the serving network.

Further, the second network element selects the available API based on the type of the serving network and invokes the available API.

For example, the type of the serving network that is in the second message received by the second network element is an EPC, namely, a 4G network. In this case, the second network element may select and invoke a 4G API.

In this embodiment, after receiving the identity information of the terminal that is sent by the second network element, the first network element obtains the type information of the serving network corresponding to the identity information, and sends the API information or the type information of the serving network to the second network element based on the type information of the serving network. As such, the second network element can select the available API based on the API information or the type information of the serving network and invoke the available API, thereby avoiding an API invoke error.

Figure 5:
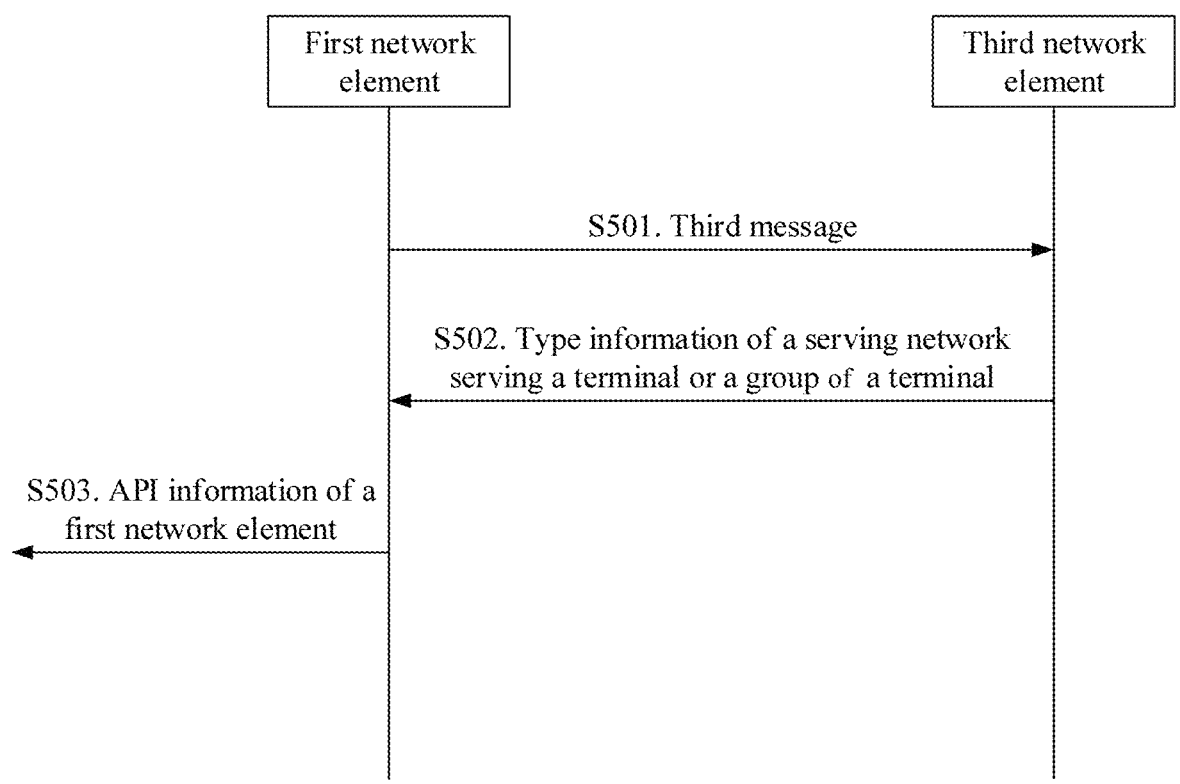
FIG. 5 is an interaction flowchart of another communication method according to this application.

FIG. 5 is an interaction flowchart of another communication method according to this application. As shown in FIG. 5, an interaction process of the method is as follows.

S501. A first network element sends a third message to a third network element, where the third message is used to request type information of a serving network of a terminal or a group of a terminal.

When the third message is used to request the type information of the serving network of the terminal, the third message may include an identity of the terminal; or when the third message is used to request the type information of the serving network of the group of the terminal, the third message may include an identity of a group of the terminal.

The third network element may be an HSS-UDM integrated network element, a PCF-PCRF integrated network element, an MME, or an AMF. This is not limited.

In an example, when the third network element is the MME or the AMF, the first network element may first send the third message to the HSS-UDM integrated network element or the PCF-PCRF integrated network element. Then the HSS-UDM integrated network element or the PCF-PCRF integrated network element sends the third message to the MME or the AMF.

In another example, when the first network element receives a first message from a second network element, the first network element performs this step. To be more specific, when the second network element requests to obtain API information of the first network element or the type information of the serving network of the terminal, the first network element may send the third message to the third network element, to obtain the type information of the serving network.

For nouns such as the serving network of the terminal or the group of the terminal, the type information, the identity of the group, and the identity of the terminal, refer to the related descriptions in the embodiment shown in FIG. 4. Details are not described herein again.

In an optional implementation, the third message is a subscription message, and the subscription message is used to subscribe to a type of the serving network.

For example, the first message is a third event subscription message or a third monitoring request message. The third event subscription message or the third monitoring request message includes an identity of a serving network type change event. In addition, the third event subscription message or the third monitoring request message further includes the identity of the terminal or the identity of the group. The third network element supports the serving network type change event, and the serving network type change event may be identified by CN Type Change. After receiving the identity of the serving network type change event, the third network element may start to detect the serving network type change event. A process is described in Embodiment 1 below.

In another optional implementation, the third message is a query message, and the query message is used to query a type of the serving network.

For example, the third message is a terminal-register-with-network request message, and the terminal-register-with-network request message includes the identity of the terminal or the identity of the group.

For example, the third message may be a terminal context request message. For the message, the third network element supports a new context type, which is referred to as a serving network type. The terminal context request message includes a serving network type context type identity, the identity of the terminal, or the identity of the group.

S502. The third network element sends the type information based on the third message.

In an example, when the third message is the subscription message, the third network element may store information about the serving network type change event in the subscription message, and detect whether the type of the serving network changes. When detecting that the type of the serving network changes, the third network element sends the type information of the serving network to the first network element.

In another example, when the third message is the query message, the third network element queries the type of the serving network based on the third message, and sends the type of the serving network to the first network element. The third network element stores a type of a network serving the terminal or the group of the terminal. Additionally, after receiving the third message, the third network element recognizes the identity of the terminal or the identity of the group that is in the third message, and then queries, from the stored information, a network type corresponding to the terminal or the group of the terminal.

Optionally, the third network element sends the type information using a fourth message.

Corresponding to the third message, the fourth message has the following two forms.

Form 1: When the third message is the subscription message, the fourth message is a notification message.

For example, the fourth message is a third event notification message or a third monitoring response message, and the third event notification message or the third monitoring response message includes a serving network type change indication or the type of the serving network, and further includes the identity of the terminal or the identity of the group. The serving network type change indication may be a CN Type Change Indication.

Form 2: When the third message is the query message, the fourth message is a response message for the third message.

For example, the fourth message is a terminal-register-with-network response message, and the terminal-register-with-network response message includes the type information of the serving network.

For example, the fourth message may be a terminal context response message, and the terminal context response message includes the type of the serving network.

S503. The first network element sends API information of the first network element based on the type information.

A process for performing S503 is the same as the process for performing step S403, and reference may be made to step S403. Details are not described herein again.

In this embodiment, the first network element sends the third message to the third network element, to request the type information of the serving network of the terminal or the group of the terminal. The third network element obtains, based on the third message, the type information of the serving network of the terminal or the group of the terminal, and sends the type information to the first network element. As such, the first network element can obtain the type information of the serving network, and send the API information of the first network element or the type information of the serving network to the second network element. Then the second network element can invoke the available API based on the API information or the type information of the serving network, thereby avoiding an API invoke error.

The following further explains the solutions of this application using process examples. The related embodiments are described below.

Embodiment 1 relates to a communication method between a first network element and a third network element. In this method, a subscription message is used to obtain type information of a serving network of a terminal or a group of a terminal.

Embodiment 2 relates to a communication method between a first network element and a third network element. In this method, a subscription message is used to obtain type information of a serving network of a terminal or a group of a terminal.

Embodiment 3 relates to a communication method between a first network element and a third network element. In this method, a query message is used to obtain type information of a serving network of a terminal or a group of a terminal.

Embodiment 4 relates to a communication method between a first network element and a third network element. In this method, a query message is used to obtain type information of a serving network of a terminal or a group of a terminal.

Embodiment 5 relates to a communication method between a first network element and a second network element. In this method, a subscription message is used, and the first network element returns API state information.

Embodiment 6 relates to a communication method between a first network element and a second network element. In this method, a query message is used, and the first network element returns API state information.

Embodiment 7 relates to a communication method between a first network element and a second network element. In this method, an API invoke manner is used, and the first network element returns an API invoke result.

Embodiment 8 relates to a communication method between a first network element and a second network element. In this method, a subscription message is used, and the first network element returns type information of a serving network.

Embodiment 9 relates to a communication method between a first network element and a second network element. In this method, a query message is used, and the first network element returns type information of a serving network.

In the following Embodiments 1 to 9, an SCEF-NEF integrated network element is used as an example of the first network element. In addition, in the following embodiments, a message including an identity of a terminal is used as an example. However, a message including an identity of a group of the terminal is also applicable to this application, and details are not further described.

Embodiment 1

Figure 6:
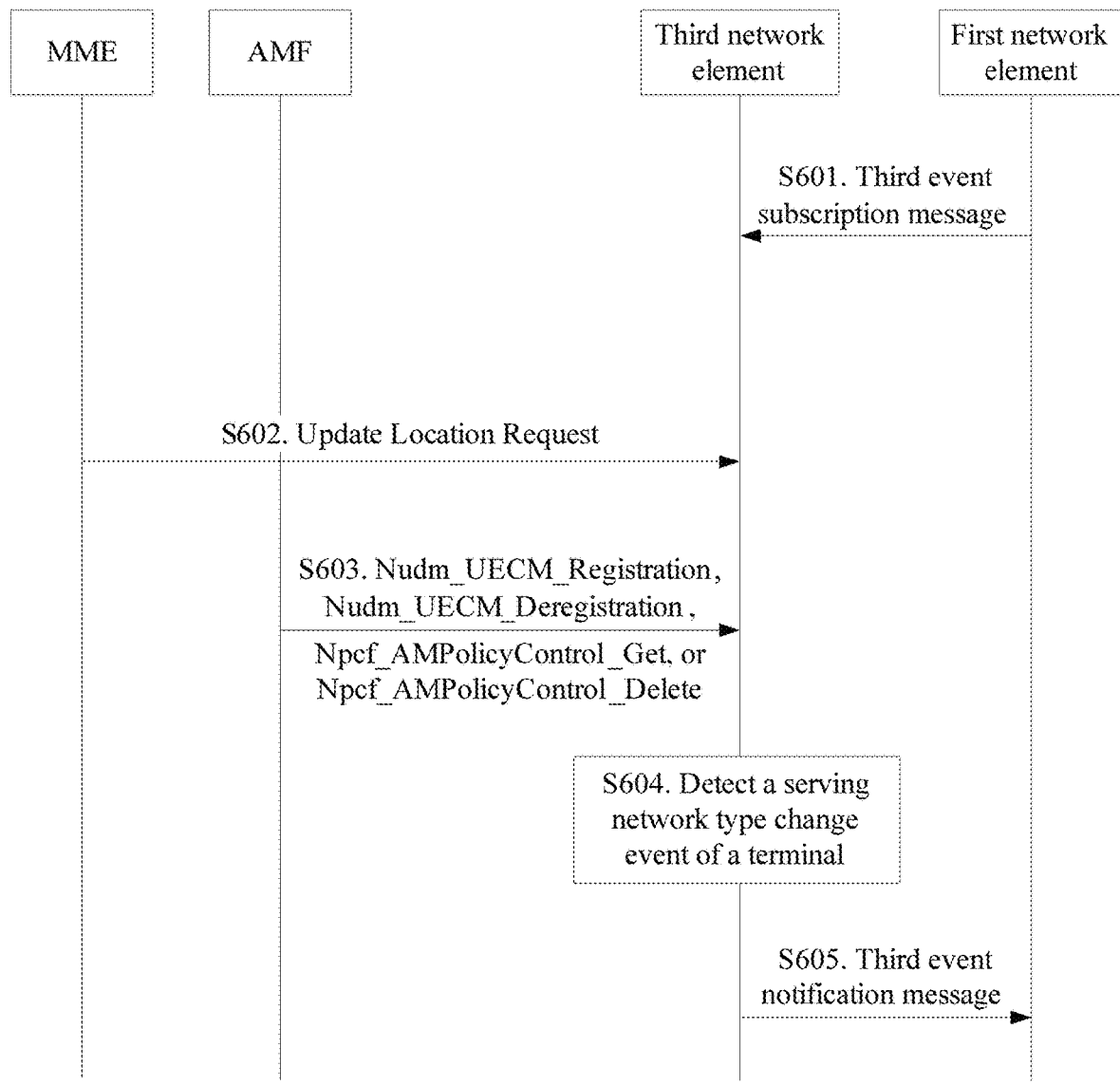
FIG. 6 is a flowchart of a communication method according to Embodiment 1.

FIG. 6 is a flowchart of a communication method according to Embodiment 1. As shown in FIG. 6, a third network element is an HSS-UDM integrated network element, or a PCF-PCRF integrated network element. The method is described below.

S601. A first network element sends a third event subscription message to a third network element.

The third event subscription message may include an identity of a serving network type change (CN Type Change) event and an identity of a terminal.

The identity of the CN Type Change event may be an event name or the like.

After receiving the third event subscription message, the third network element may store related information about the CN Type Change event, where the related information about the CN Type Change event includes the identity of the terminal and the identity of the CN Type Change event.

For example, after receiving the third event subscription message, the third network element stores the identity of the terminal and the identity of the CN Type Change event that are carried in a third message.

When the terminal switches between a 4G network and a 5G network or registers with a 4G network or a 5G network, subsequent steps S604 to S607 are triggered to be performed.

For example, when a position of the terminal changes, the terminal may switch between the 4G network and the 5G network, and further, subsequent steps S602 to S605 are triggered to be performed.

S602. An MME sends an update location request message to the third network element.

S603. An AMF sends an Nudm_UECM_Registration, Nudm_UECM_Deregistration, Npcf_AMPolicyControl_Get, or Npcf_AMPolicyControl_Delete message to the third network element.

For example, the Nudm_UECM_Registration message is used to register, with the UDM, information about a network element serving the terminal. The Nudm_UECM_Deregistration message is used to request to delete the information about the network element serving the terminal that is stored in the UDM. The Npcf_AMPolicyControl_Get message is used to register, with the PCF, the information about the network element serving the network. The Npcf_AMPolicyControl_Delete message is used to request to delete the information about the network element serving the terminal that is stored in the PCF.

In an example, when the terminal registers with or switches to the 4G network, the MME may send the Update Location Request message to the third network element. Additionally, the AMF may send the Nudm_UECM_Deregistration message and the Npcf_AMPolicyControl_Delete message to the third network element.

In another example, when the terminal registers with or switches to the 5G network, the AMF may send the Nudm_UECM_Registration message and the Npcf_AMPolicyControl_Get message to the third network element.

S604. The third network element detects a serving network type change event of a terminal.

In an example, when the HSS-UDM integrated network element receives the Update Location Request, Nudm_UECM_Registration, or Nudm_UECM_Deregistration message, the network element may detect that a type of a serving network changes.

In another example, when the PCF-PCRF integrated network element receives the Npcf_AMPolicyControl_Get or Npcf_AMPolicyControl_Delete message, the network element may detect that a type of a serving network changes.

The Update Location Request, Nudm_UECM_Registration, Nudm_UECM_Deregistration, Npcf_AMPolicyControl_Get, and Npcf_AMPolicyControl_Delete message include the identity of the terminal. Further, the HSS-UDM integrated network element or the PCF-PCRF integrated network element may detect, based on the type of the serving network, a network element identity, the identity of the terminal included in the message, and a sender of the message that are previously stored, whether the type of the serving network changes.

For example, before the HSS-UDM integrated network element receives the Update Location Request message sent by the MME and the Nudm_UECM_Deregistration message sent by the AMF, the type of the serving network of the terminal that is stored by the HSS-UDM integrated network element is 5GC, and the network element identity is an AMF name or an AMF Identifier. Based on the identity of the terminal in the received message, the Update Location Request message is sent by the MME, and a network element identity of the AMF that sends the Nudm_UECM_Deregistration message is the stored AMF name or AMF Identifier. In this case, the HSS-UDM integrated network element may determine that the type of the serving network changes, and the terminal is currently served by an EPC.

S605. The third network element sends a third event notification message to the first network element.

The third event notification message includes the identity of the terminal.

In addition, the third event notification message further includes a network type change indication (CN Type Change Indication) or the type of the serving network.

In this embodiment, the first network element sends the third event subscription message to the third network element, to request type information of the serving network of the terminal or a group of the terminal. The third network element obtains the type information of the serving network of the terminal or the group of the terminal, and sends the type information to the first network element, such that the first network element can obtain the type information of the serving network, and send API information of the first network element or the type information of the serving network to a second network element. Then the second network element can invoke an available API based on the API information or the type information of the serving network, thereby avoiding an API invoke error.

Based on Embodiment 1, this application further provides another communication method. The method includes the foregoing steps S601 to S605, but has the following differences.

The third event subscription message in step S601 is replaced with a third monitoring request message, and the third event notification message in step S605 is replaced with a third monitoring response message. The third monitoring request message may include an identity of a serving network type change event (CN Type Change) and an identity of a terminal. The third monitoring response message includes the identity of the terminal and a network type change indication (CN Type Change Indication) or the type of the serving network.

Embodiment 2

Figure 7:
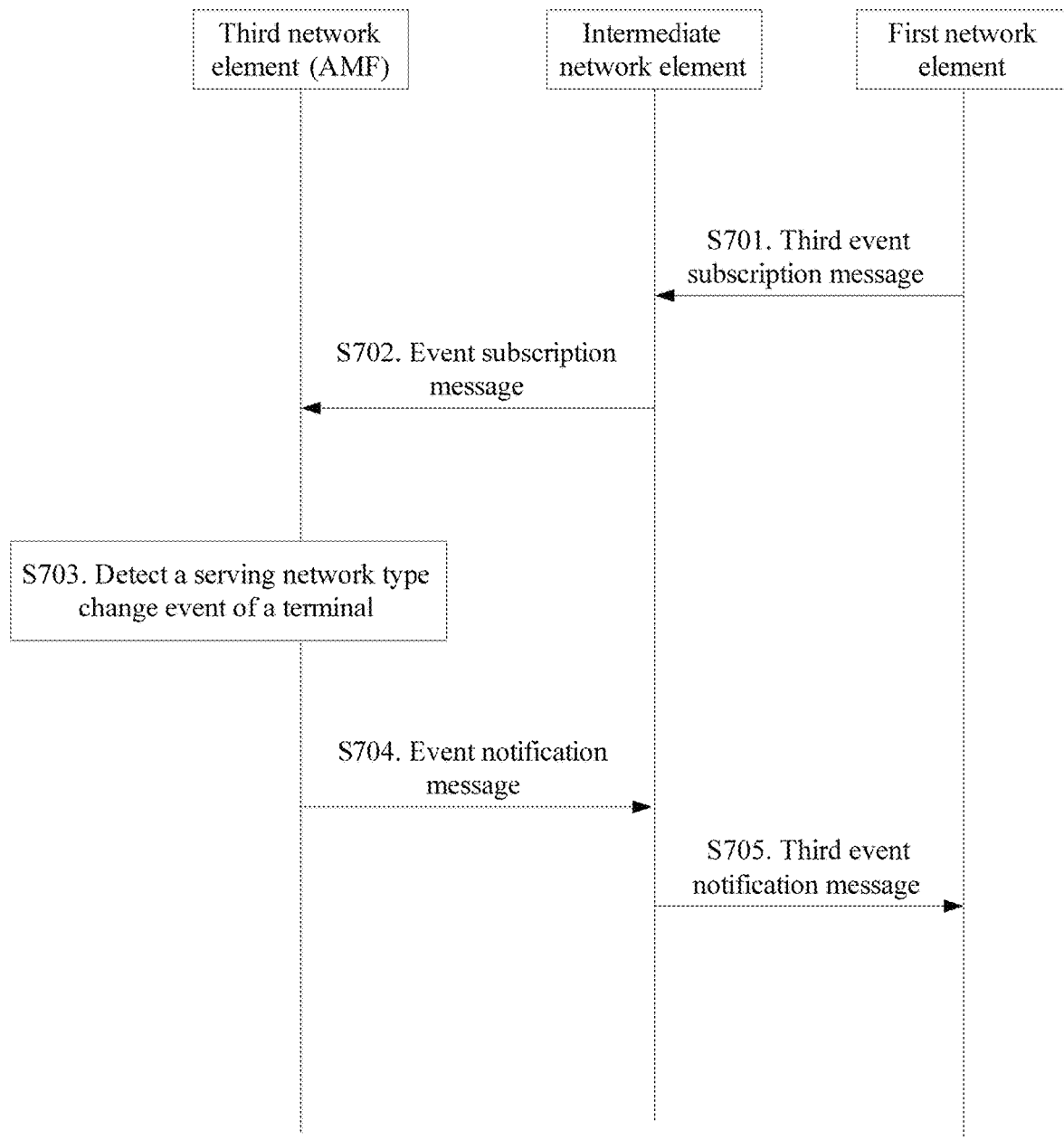
FIG. 7 is a flowchart of a communication method according to Embodiment 2.

FIG. 7 is a flowchart of a communication method according to Embodiment 2. As shown in FIG. 7, a third network element is an MME or an AMF. The following steps are described using an example in which the third network element is the AMF. Processing related to the MME is described after step S705.

S701. A first network element sends a third event subscription message to an intermediate network element.

The intermediate network element may be an HSS-UDM integrated network element, or may be a PCF-PCRF integrated network element. Intermediate network elements in the following embodiments have a same meaning as the intermediate network element herein. Details are not repeated.

The third event subscription message may include an identity of a serving network type change (CN Type Change) event and an identity of a terminal.

The identity of the CN Type Change event may be an event name or the like.

S702. The intermediate network element sends an event subscription message to a third network element.

The event subscription message may include the identity of the serving network type change (CN Type Change) event and the identity of the terminal.

It should be noted that this step is an optional step, that is, the first network element may send the event subscription message to the third network element through the intermediate network element. Alternatively, instead of performing this step, the first network element directly sends the third event subscription message to the third network element.

After receiving the event subscription message sent by the intermediate network element, the third network element may store related information about the CN Type Change event, where the related information about the CN Type Change event includes the identity of the terminal and the identity of the CN Type Change event.

For example, after receiving the event subscription message sent by the intermediate network element, the third network element stores the identity of the terminal and the identity of the CN Type Change event that are carried in the event subscription message.

When the terminal switches between a 4G network and a 5G network or registers with a 4G network or a 5G network, subsequent steps S703 to S705 are triggered to be performed.

For example, when a position of the terminal changes, the terminal may switch between the 4G network and the 5G network, and further, subsequent steps S703 to S705 are triggered to be performed.

S703. The third network element detects a serving network type change event of a terminal.

In an example, the third network element is the AMF. When the AMF receives a switch request from the MME, and the switch request is used to request to switch the terminal from the 4G network to the 5G network, or when the AMF receives a registration request from the terminal, the AMF determines that a type of a serving network of the terminal changes.

S704. The third network element sends an event notification message to the intermediate network element.

The event notification message may include the identity of the terminal. In addition, the event notification message may further include a serving network type change indication (CN Type Change Indication) or the type of the serving network.

S705. The intermediate network element sends a third event notification message to the first network element.

The third event notification message may include the identity of the terminal. In addition, the third event notification message further includes the serving network type change indication (CN Type Change Indication) or the type of the serving network.

It should be noted that this step may also be an optional step, that is, the third network element may also directly send the third event notification message or a third monitoring response message to the first network element.

If the third network element is the MME, the first network element sends the third monitoring request message to the intermediate network element in step S701, and the third monitoring request message may include an identity of the serving network type change (CN Type Change) event and an identity of the terminal. Then, in step S702, the intermediate network element sends a monitoring request message to the third network element, and the monitoring request message includes the identity of the serving network type change (CN Type Change) event and the identity of the terminal. Then, the third network element stores related information about the CN Type Change event. Then, the third network element detects the serving network type change event of the terminal. For example, after the MME receives a terminal switch request from the AMF or the MME receives an attach request from the terminal, the MME detects that a type of a serving network changes, and then performs subsequent steps. Then, the third network element sends a monitoring response message to the intermediate network element. The monitoring response message may include the identity of the terminal. In addition, the message further includes a serving network type change indication (CN Type Change Indication) or the type of the serving network. Then, the intermediate network element sends a third monitoring response message to the first network element. The third monitoring response message may include the identity of the terminal. In addition, the third monitoring response message further includes the serving network type change indication (CN Type Change Indication) or the type of the serving network.

It should be noted that a process for performing step S702 may be as follows.

When the terminal is a terminal in a dual registration mode, the intermediate network element may send the event subscription message to both the MME and the AMF. When the terminal is not a terminal in a dual registration mode, if a network element serving the terminal is the MME, the intermediate network element sends the event subscription message to the MME. If a network element serving the terminal is the AMF, the intermediate network element sends the event subscription message to the AMF.

In this embodiment, the first network element sends the third event subscription message or the third monitoring request message to the third network element, to request type information of the serving network of the terminal or a group of the terminal. The third network element obtains the type information of the serving network of the terminal or the group of the terminal, and sends the type information to the first network element, such that the first network element can obtain the type information of the serving network, and send API information of the first network element or the type information of the serving network to a second network element. Then the second network element can invoke an available API based on the API information or the type information of the serving network, thereby avoiding an API invoke error.

Embodiment 3

Figure 8:
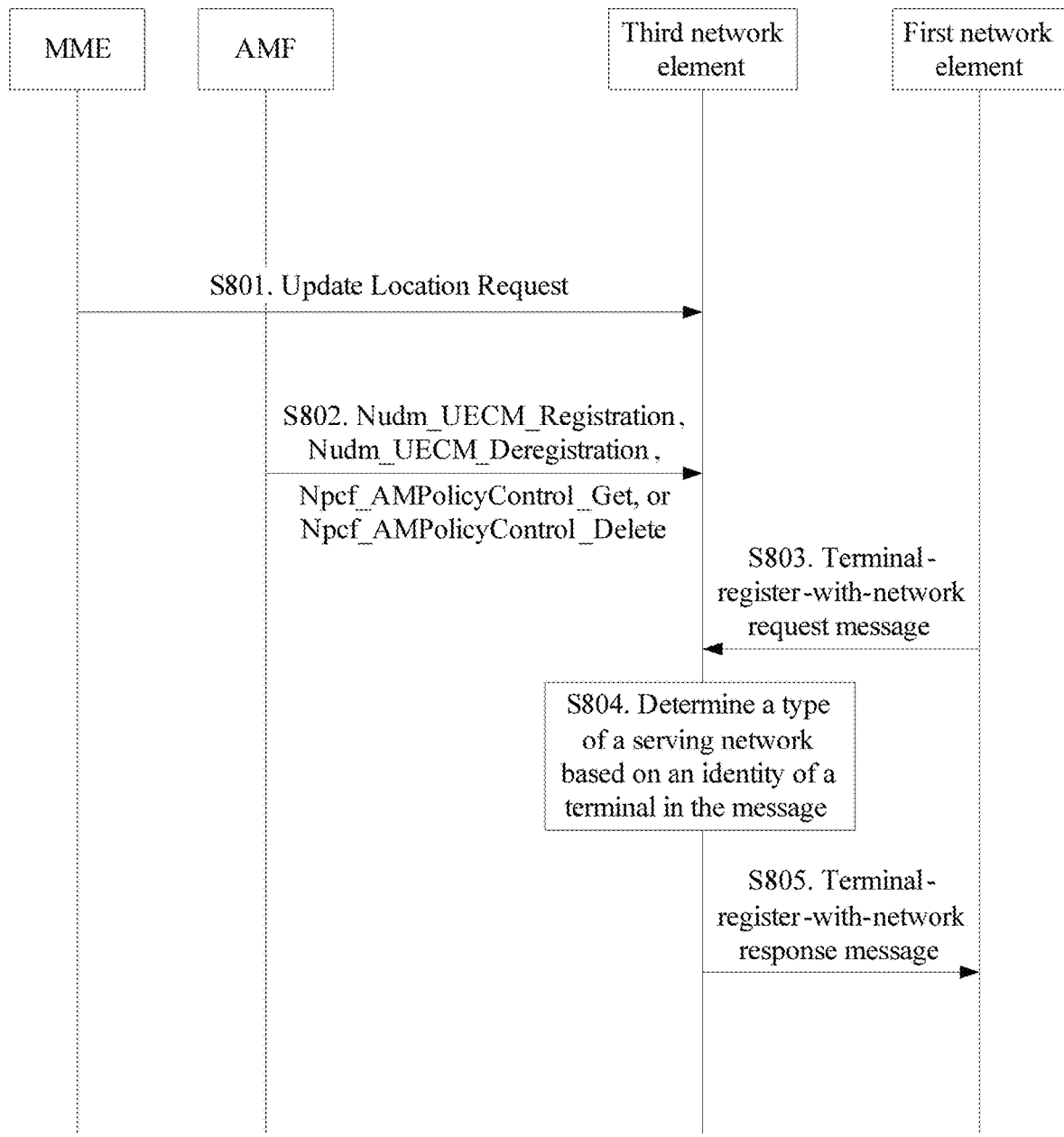
FIG. 8 is a flowchart of a communication method according to Embodiment 3.

FIG. 8 is an interaction flowchart according to Embodiment 3. As shown in FIG. 8, a third network element is an HSS-UDM integrated network element, or a PCF-PCRF integrated network element. A trigger condition of this embodiment is: A terminal switches between a 4G network and a 5G network or registers with a 4G network or a 5G network.

The terminal registers with the 4G network or 5G network, or the terminal switches between 4G and 5G, such that an AMF or MME serving the terminal changes, and the following steps S801 to S805 are triggered to be performed.

For example, when a position of the terminal changes, the terminal may switch between the 4G network and the 5G network.

S801. An MME sends an Update Location Request message to a third network element.

S802. An AMF sends an Nudm_UECM_Registration, Nudm_UECM_Deregistration, Npcf_AMPolicyControl_Get, or Npcf_AMPolicyControl_Delete message to the third network element.

For example, the Nudm_UECM_Registration message is used to register, with the UDM, information about a network element serving the terminal. The Nudm_UECM_Deregistration message is used to request to delete the information about the network element serving the terminal that is stored in the UDM. The Npcf_AMPolicyControl_Get message is used to register, with the PCF, the information about the network element serving the network. The Npcf_AMPolicyControl_Delete message is used to request to delete the information about the network element serving the terminal that is stored in the PCF.

For example, when the terminal registers with or switches to the 4G network, the MME may send the Update Location Request message to the third network element. Additionally, the AMF may send the Nudm_UECM_Deregistration message and the Npcf_AMPolicyControl_Delete message to the third network element.

When the terminal registers with or switches to the 5G network, the AMF may send the Nudm_UECM_Registration message and the Npcf_AMPolicyControl_Get message to the third network element.

The third network element stores, based on the received message, an identity of the network element serving the terminal.

S803. A first network element sends a terminal-register-with-network request message to the third network element, where the message includes an identity of the terminal.

The first network element may periodically send the terminal-register-with-network request message to the third network element, or may send the terminal-register-with-network request message after receiving a request from an AF.

S804. The third network element determines a type of a serving network based on the identity of the terminal in the message.

For example, the third network element determines the type of the serving network based on the stored identity of the network element serving the terminal.

S805. The third network element sends a terminal-register-with-network response message to the first network element, where the message includes the type of the serving network.

In this embodiment, the first network element sends the terminal-register-with-network request message to the third network element, to request the type of the serving network of the terminal or a group of the terminal. The third network element obtains the type of the serving network of the terminal or the group of the terminal, and sends the type of the serving network to the first network element, such that the first network element can obtain the type of the serving network, and send API information of the first network element or type information of the serving network to a second network element. Then the second network element can invoke an available API based on the API information or the type information of the serving network, thereby avoiding an API invoke error.

Embodiment 4

Figure 9:
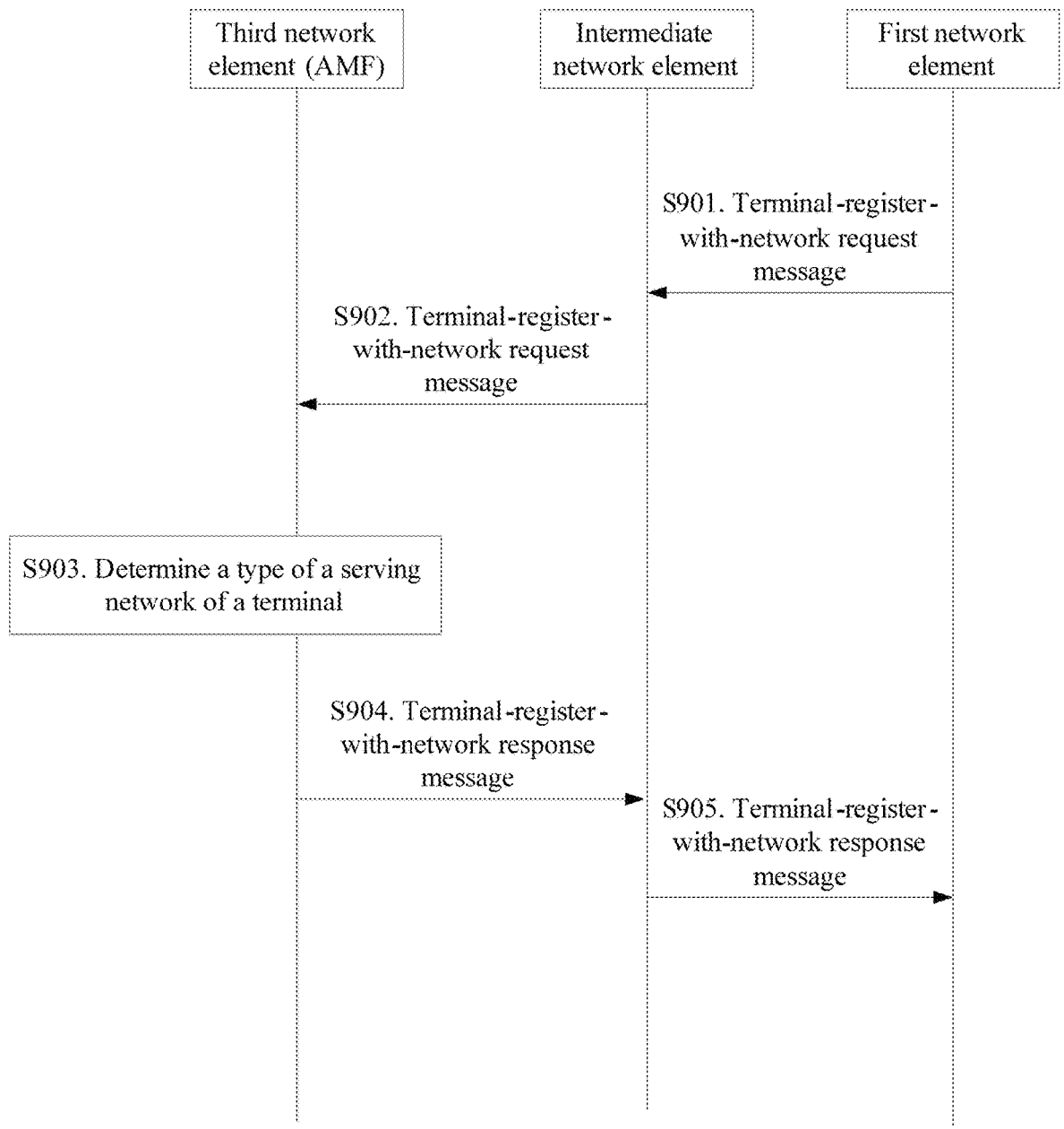
FIG. 9 is a flowchart of a communication method according to Embodiment 4.

FIG. 9 is an interaction flowchart according to Embodiment 4. As shown in FIG. 9, a third network element is an MME or an AMF. A trigger condition of this embodiment is: A terminal switches between a 4G network and a 5G network or registers with a 4G network or a 5G network.

For example, the terminal registers with the 4G network or 5G network, or the terminal switches between the 4G network and the 5G network, such that the AMF or the MME serving the terminal changes, and the following steps S901 to S905 are triggered to be performed.

For example, when a position of the terminal changes, the terminal may switch between the 4G network and the 5G network.

S901. A first network element sends a terminal-register-with-network request message to an intermediate network element, where the message includes an identity of a terminal.

The first network element may periodically send the terminal-register-with-network request message to the intermediate network element, or may send the terminal-register-with-network request message after receiving a request from an AF.

S902. The intermediate network element sends the terminal-register-with-network request message to a third network element.

It should be noted that this step is an optional step, that is, the first network element may alternatively directly send the terminal-register-with-network request message to the third network element.

S903. The third network element determines a type of a serving network of the terminal.

For example, if the third network element is the MME, the third network element directly determines that the type of the serving network is EPC. If the third network element is the AMF, the third network element directly determines that the type of the serving network is 5GC.

S904. The third network element sends a terminal-register-with-network response message to the intermediate network element.

The terminal-register-with-network response message includes the type of the serving network.

S905. The intermediate network element sends the terminal-register-with-network response message to the first network element, where the message includes the type of the serving network.

It should be noted that this step is also an optional step, that is, the third network element may alternatively directly send the terminal-register-with-network response message to the first network element.

In this embodiment, the first network element sends the terminal-register-with-network request message to the third network element, to request the type of the serving network of the terminal or a group of the terminal. The third network element obtains the type of the serving network of the terminal or the group of the terminal, and sends the type of the serving network to the first network element, such that the first network element can obtain the type of the serving network, and send API information of the first network element or type information of the serving network to a second network element. Then the second network element can invoke an available API based on the API information or the type information of the serving network, thereby avoiding an API invoke error.

Embodiment 5

Figure 10:
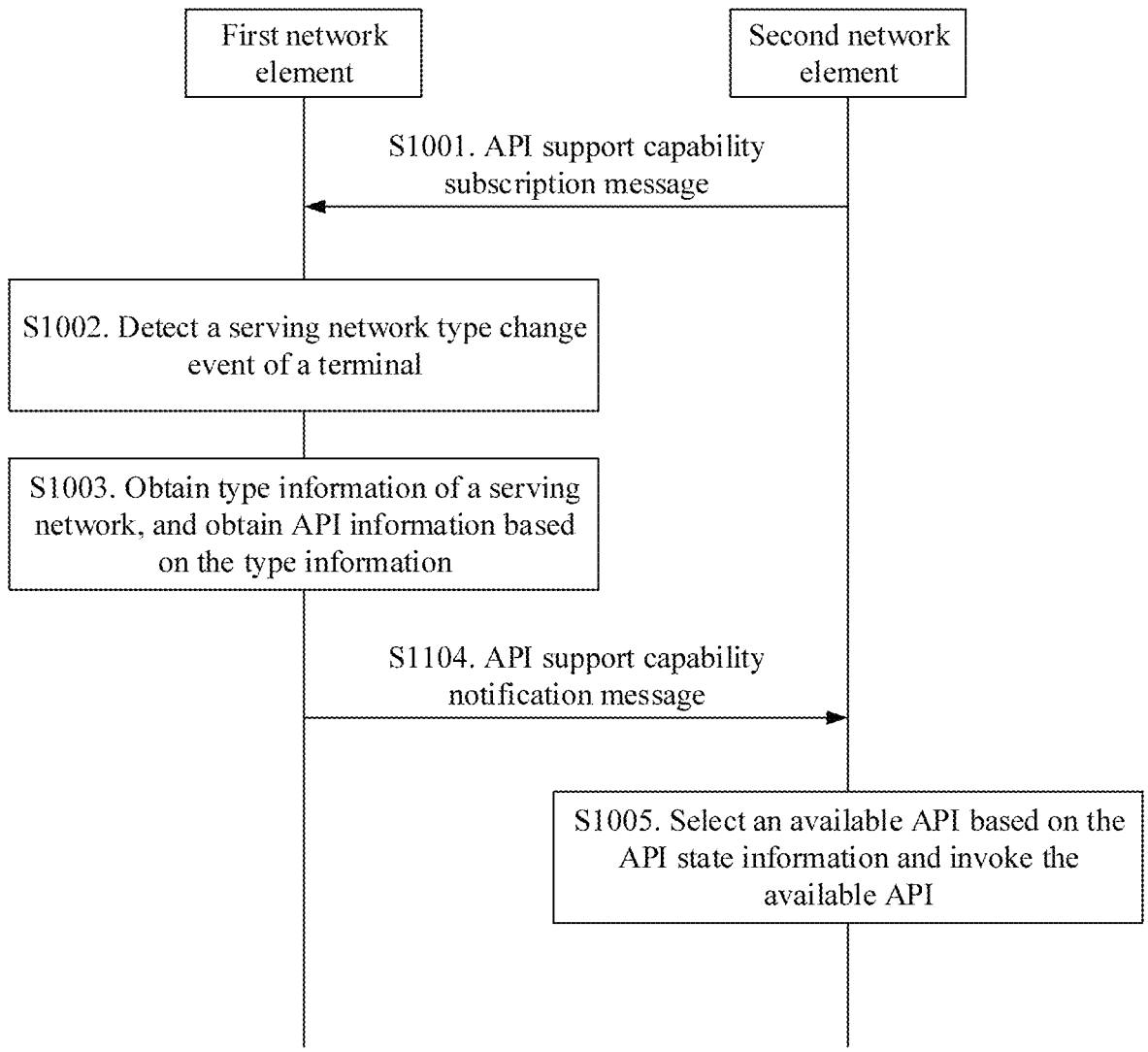
FIG. 10 is a flowchart of a communication method according to Embodiment 5.

FIG. 10 is an interaction flowchart according to Embodiment 5. As shown in FIG. 10, a first network element and a second network element interact as follows.

S1001. The second network element sends an API support capability subscription message to the first network element.

The API support capability subscription message may be used to subscribe to an API support capability.

The message includes an identity of a terminal, and reference may be made to the related descriptions in the foregoing embodiments. Details are not further described.

S1002. The first network element detects a serving network type change event of a terminal.

Step S1002 may be implemented with reference to the method according to Embodiment 1 or Embodiment 2. Details are not further described.

S1003. The first network element obtains type information of a serving network, and obtains API information based on the type information.

The API information may be an API Indication. In addition, for the serving network and the type information, refer to the related descriptions in the foregoing embodiments. Details are not further described.

That the first network element obtains the type information of the serving network in S1003 may be implemented with reference to the method according to Embodiment 1 or 2. Details are not further described.

In an example, when the type of the serving network of the terminal recorded by the first network element is an EPC, after the first network element receives a serving network type change indication sent by a third network element, the first network element determines that the serving network of the terminal changes, and then detects that an API support capability change event occurs. The first network element generates the API information based on the type information, for example, generates a list of available API(s). Assuming that the terminal moves from a 4G network to a 5G network, after the first network element detects that the API support capability change event occurs, the first network element may determine that an EPC API is unavailable and a 5GC API is available.

S1004. The first network element sends an API support capability notification message to the second network element.

Optionally, the API support capability notification message includes API state information and the identity of the terminal.

S1005. The second network element selects an available API based on API state information and invokes the available API.

For example, the API state information is the list of available API(s). After receiving the list of available API(s), the second network element may select an API in the list of available API(s) and invoke the API. For example, the list of available API(s) includes two records: A first record is an API1, and a second record is an API2. The API1 is a position API. When an application in the second network element needs to use position information of the terminal, the second network element may send an API1 invoke request to the first network element.

In this embodiment, after receiving the API support capability subscription message, a first event subscription message, or a first monitoring request message that is sent by the second network element, the first network element obtains the type information of the serving network corresponding to the terminal, and sends the API information to the second network element based on the type information of the serving network. As such, the second network element can select the available API based on the API information and invoke the available API, thereby avoiding an API invoke error.

Based on Embodiment 5, this application further provides another communication method. The method includes the foregoing steps S1001 to S1005, but has the following differences: The API support capability subscription message in step S1001 is replaced with an event subscription message, and the API support capability notification message in step S1004 is replaced with an event notification message.

Based on Embodiment 5, this application further provides still another communication method. The method includes the foregoing steps S1001 to S1005, but has the following differences: The API support capability subscription message in step S1001 is replaced with a monitoring request message, and the API support capability notification message in step S1004 is replaced with a monitoring response message.

The event subscription message or the monitoring request message may be used to subscribe to an API support capability, and the event subscription message or the monitoring request message may include an identity of an API support capability change (APISupportCapability Change) event.

Optionally, the event notification message or the monitoring response message includes API state information and an identity of a terminal.

Embodiment 6

Figure 11:
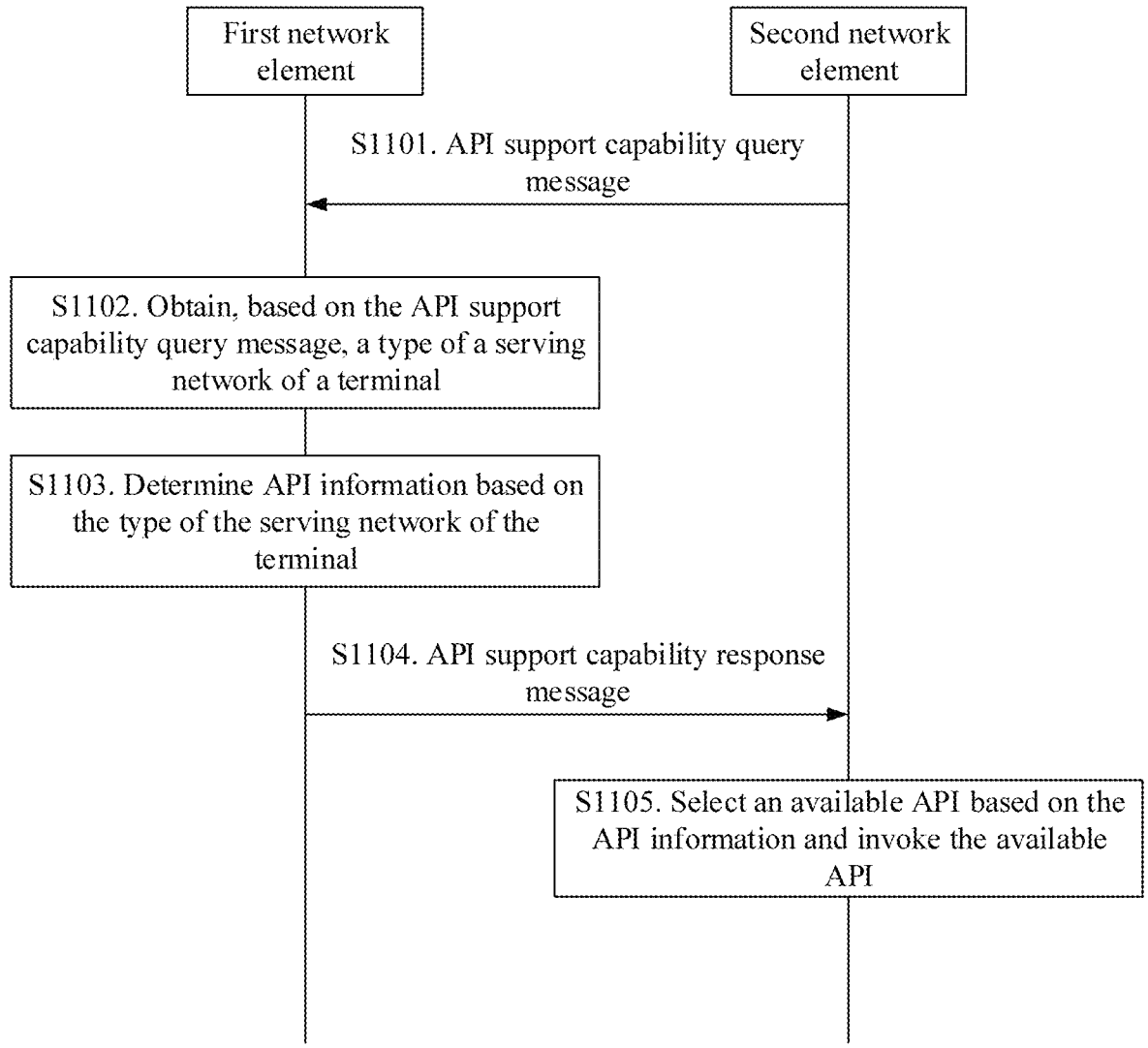
FIG. 11 is a flowchart of a communication method according to Embodiment 6.

FIG. 11 is an interaction flowchart according to Embodiment 6. As shown in FIG. 11, a first network element and a second network element interact as follows.

S1101. The second network element sends an API support capability query message to the first network element.

The message includes an identity of a terminal.

S1102. The first network element obtains, based on the API support capability query message, a type of a serving network of a terminal.

For example, after receiving the API support capability query message, the first network element may send a query message to a third network element, to obtain the type of the serving network of the terminal. For details, refer to the methods according to Embodiment 3 and Embodiment 4. Details are not further described.

S1103. The first network element determines API information based on the type of the serving network of the terminal.

For the API information, refer to the related descriptions in the foregoing embodiments. Details are not further described.

For example, when the type of the serving network of the terminal is an EPC, the first network element may determine that an EPC API is available and a 5GC API is unavailable, and then generate the API information, for example, a list of available API(s).

S1104. The first network element sends an API support capability response message to the second network element.

The message includes the API information.

S1105. The second network element selects an available API based on the API information and invokes the available API.

For an implementation of step S1105, refer to the related descriptions in the foregoing embodiments. Details are not further described.

In this embodiment, after receiving the API support capability query message sent by the second network element, the first network element obtains the type information of the serving network corresponding to the terminal, and sends the API information to the second network element based on the type information of the serving network. As such, the second network element can select the available API based on the API information and invoke the available API, thereby avoiding an API invoke error.

Embodiment 7

Figure 12:
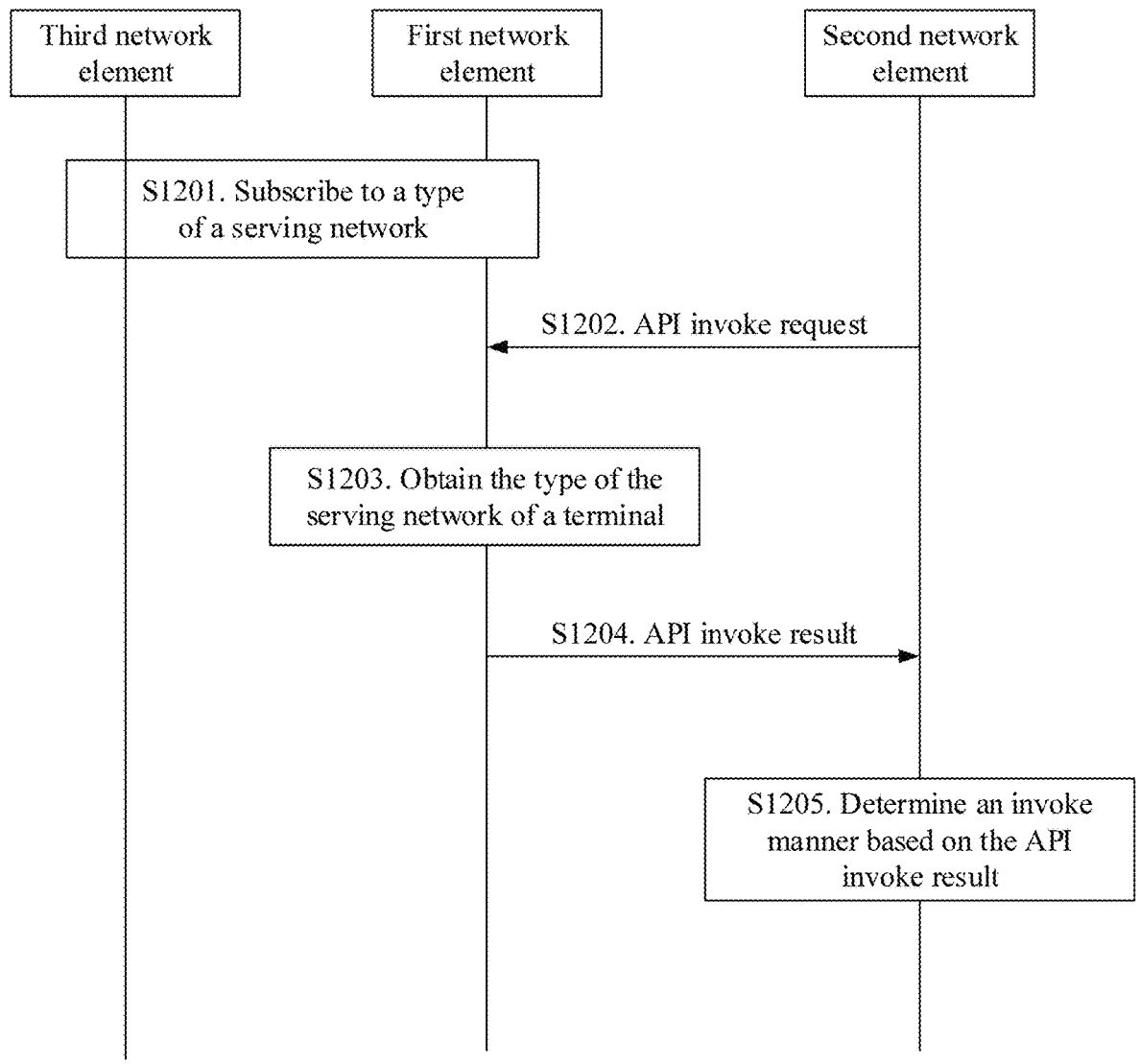
FIG. 12 is a flowchart of a communication method according to Embodiment 7.

FIG. 12 is an interaction flowchart according to Embodiment 7. As shown in FIG. 12, a first network element and a second network element interact as follows.

S1201. The first network element subscribes to a type of a serving network of a terminal from a third network element.

Correspondingly, the third network element may send, to the first network element, the type of the serving network of the terminal. For example, the third network element sends, using a notification message about the subscription event, the type of the serving network of the terminal.

S1202. The second network element sends an API invoke request to the first network element.

The API invoke request is used to invoke a specific API.

Optionally, when the first network element receives the API invoke request, and the first network element does not store the type of the serving network of the terminal, step S1203 is performed.

S1203. The first network element obtains, by interacting with the third network element, the type of the serving network of the terminal.

Step S1203 may be implemented using the method according to Embodiment 3 or 4. Details are not further described.

S1204. The first network element returns an API invoke result to the second network element based on the type of the serving network of the terminal.

For example, if the type of the serving network of the terminal is an EPC, and an API that the second network element requests to invoke is a 4G API, the first network element normally feeds back an API invoke response, to the second network element.

If the type of the serving network of the terminal is an EPC, and an API that the second network element requests to invoke is a 5G API, the first network element feeds back an API invoke response including an error code and a timer, to the second network element.

The error code may indicate that the error code is permanently available or temporarily unavailable. Only when the error code is temporarily unavailable, the timer is included.

S1205. The second network element determines an invoke manner based on the API invoke result.

The invoke manner may include: When the timer expires, the API is invoked again or another API with a similar function as the API is invoked.

For example, if the first network element normally feeds back the API invoke response to the second network element, the second network element may continue to perform an API invoke process according to an existing procedure. If the first network element normally feeds back the API invoke response including the error code and the timer, to the second network element, after the timer expires, the second network element chooses, based on the error code and the timer, to continue to invoke the original API, or select and invoke another API with a similar function as the API.

Embodiment 8

Figure 13:
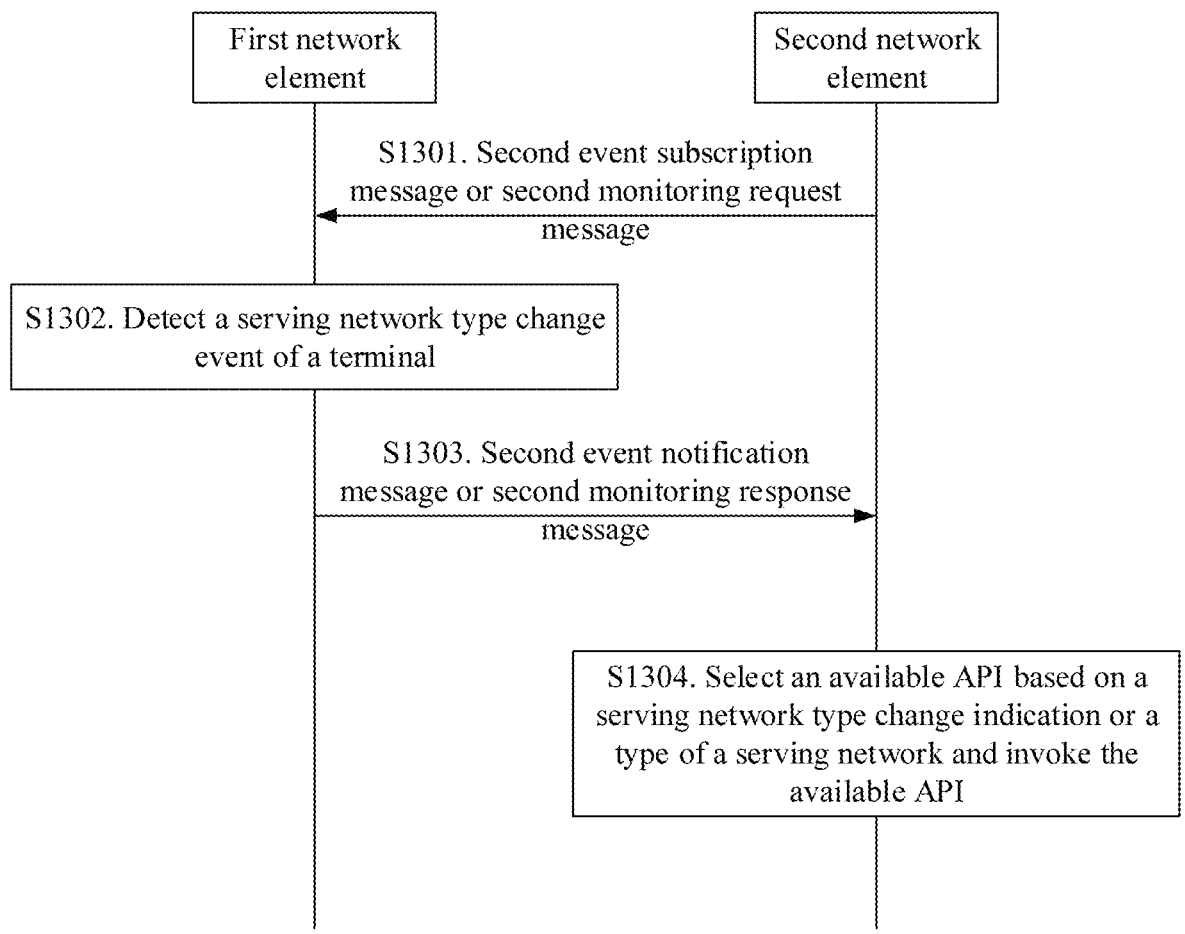
FIG. 13 is a flowchart of a communication method according to Embodiment 8.

FIG. 13 is an interaction flowchart according to Embodiment 8. As shown in FIG. 13, a first network element and a second network element interact as follows.

S1301. The second network element sends a second event subscription message to the first network element.

The second event subscription message includes an identity of a serving network type change event and an identity of a terminal.

The serving network type change event may be CN Type Change.

S1302. The first network element detects, by interacting with a third network element, a serving network type change event of a terminal.

For an example, refer to Embodiment 1 and Embodiment 2.

S1303. The first network element sends a second event notification message to the second network element, where the second event notification message includes a serving network type change indication or a type of a serving network, and further includes an identity of the terminal.

The serving network type change indication may be a CN Type Change Indication.

S1304. The second network element selects an available API based on a serving network type change indication or the type of the serving network and invokes the available API.

In this embodiment, after receiving the second event subscription message or a second monitoring request message that is sent by the second network element, the first network element sends the serving network type change indication or the type of the serving network to the second network element, such that the second network element can select the available API, based on the serving network type change indication or the type of the serving network and invoke the available API, thereby avoiding an API invoke error.

Based on Embodiment 8, this application further provides another communication method. The method includes the foregoing steps S1301 to S1304, but has the following differences: The second event subscription message in step S1301 is replaced with a second monitoring request message, and the second event notification message in step S1303 is replaced with a second monitoring response message.

The second monitoring request message includes an identity of a serving network type change event and an identity of a terminal. The second monitoring response message includes a serving network type change indication or a type of a serving network, and further includes the identity of the terminal.

Embodiment 9

Figure 14:
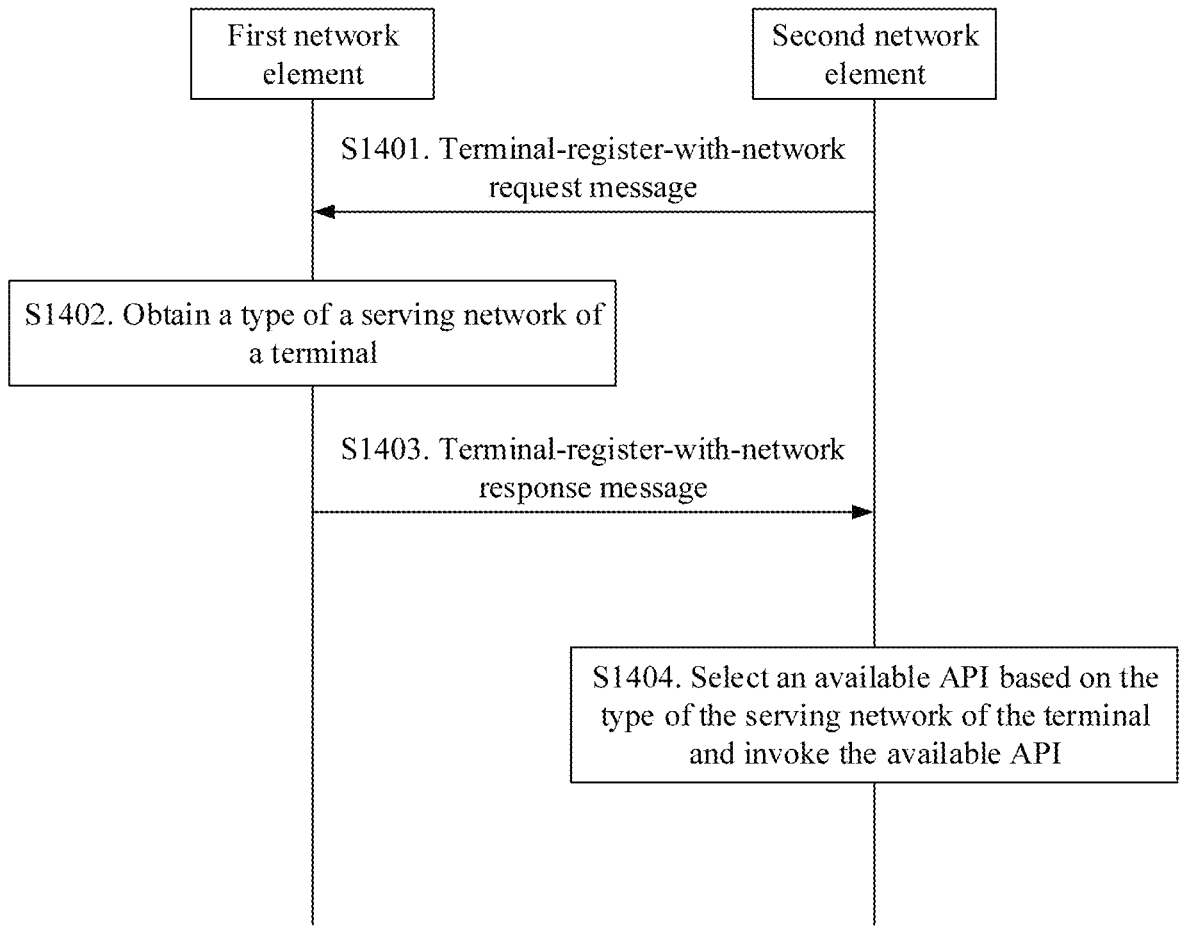
FIG. 14 is a flowchart of a communication method according to Embodiment 9.

FIG. 14 is an interaction flowchart according to Embodiment 9. As shown in FIG. 14, a first network element and a second network element interact as follows.

S1401. The second network element sends a terminal-register-with-network request message to the first network element, where the message includes an identity of a terminal.

S1402. The second network element obtains, by interacting with a third network element, a type of a serving network of the terminal.

S1403. The first network element sends a terminal-register-with-network response message to the second network element, where the message includes the type of the serving network of the terminal.

S1404. The second network element selects an available API based on the type of the serving network of the terminal and invokes the available API.

For example, an AF supports 4G related API functions and 5G related API functions. If the type of the serving network of the terminal that is received by the AF is an EPC, the AF determines that a 4G related API is the available API.

For another example, if the type of the serving network of the terminal that is received by the AF is an EPC, the AF determines that an API related to an equivalent function or an SCEF feature function is the available API.

In this embodiment, after receiving the terminal-register-with-network request message sent by the second network element, the first network element sends the type of the serving network to the second network element, such that the second network element can select the available API based on the type of the serving network and invoke the available API, thereby avoiding an API invoke error.

It should be pointed out that for the nouns and terms used in the foregoing embodiments, reference may be made to the related descriptions in the embodiment shown in FIG. 4. Details are not further described.

Figure 15:
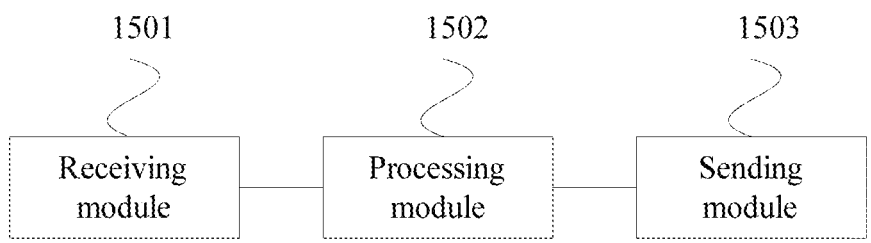
FIG. 15 is a structural diagram of modules in a first communications apparatus according to this application.

FIG. 15 is a structural diagram of modules in a first communications apparatus according to this application. The apparatus is applied to a first network element, and is configured to implement functions of the first network element in FIG. 4 and FIG. 10 to FIG. 14. As shown in FIG. 15, the apparatus includes: a receiving module 1501 configured to receive identity information of a terminal from a second network element, where the identity information includes an identity of the terminal or an identity of a group of the terminal; a processing module 1502 configured to obtain, based on the identity information, type information of a serving network corresponding to the identity information; and a sending module 1503 configured to send API information of the first network element based on the type information.

Further, the type information includes a type of the serving network or indication information used to indicate that a type of the serving network changes.

Further, the identity information is included in a first message, and the API information is included in a second message.

Further, the first message is used to subscribe to an API support capability, and the second message is used to notify the API support capability. Alternatively, the first message is used to query an API support capability, and the second message is used to respond to the first message.

Further, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

Further, the processing module 1502 is configured to send a third message to a third network element, where the third message is used to request the type information; and receive the type information from the third network element.

Figure 16:
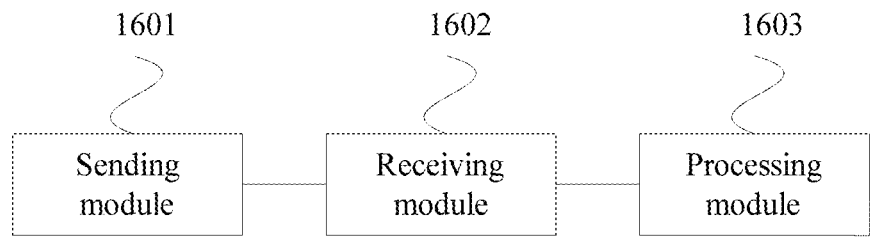
FIG. 16 is a structural diagram of modules in a second communications apparatus according to this application.

FIG. 16 is a structural diagram of modules in a second communications apparatus according to this application. The apparatus is applied to a second network element, and is configured to implement functions of the second network element in FIG. 4 and FIG. 10 to FIG. 14. As shown in FIG. 16, the apparatus includes: a sending module 1601 configured to send identity information of a terminal to a first network element, where the identity information includes an identity of the terminal or an identity of a group of the terminal; a receiving module 1602 configured to receive, from the first network element, application programming interface (API) information of the first network element; and a processing module 1603 configured to invoke an API based on the API information.

Further, the identity information is included in a first message, and the API information is included in a second message.

Further, the first message is used to subscribe to an API support capability, and the second message is used to notify the API support capability. Alternatively, the first message is used to query an API support capability, and the second message is used to respond to the first message.

Further, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

Further, the sending module 1601 is configured to: when the second network element triggers to invoke an API according to a service requirement, send the identity information of the terminal to the first network element; when a preset timer expires, send the identity information of the terminal to the first network element; or when the second network element receives, from the first network element, the indication information used to indicate that the API support capability changes, send the identity information of the terminal to the first network element.

Further, the processing module 1603 is configured to: select an available API based on the API information; and invoke the selected API.

Figure 17:
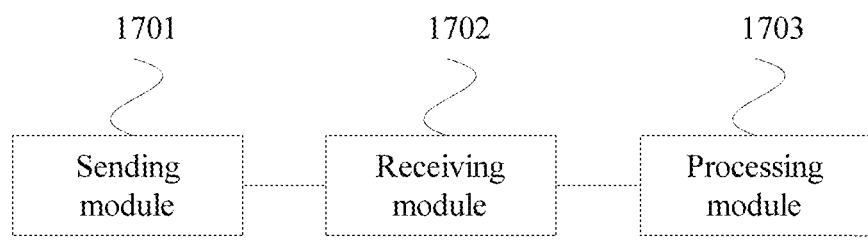
FIG. 17 is a structural diagram of modules in a third communications apparatus according to this application.

FIG. 17 is a structural diagram of modules in a third communications apparatus according to this application. The apparatus is applied to a first network element, and is configured to implement functions of the first network element in FIG. 5 and FIG. 6 to FIG. 9. As shown in FIG. 17, the apparatus includes: a sending module 1701 configured to send a third message to a third network element, where the third message is used to request type information of a serving network of a terminal or a group of a terminal; a receiving module 1702 configured to receive the type information from the third network element; and a processing module 1703 configured to send API information of the first network element based on the type information using the sending module 1701.

Further, the type information includes a type of the serving network or indication information used to indicate that a type of the serving network changes.

Further, the type information is included in a fourth message. Additionally, the third message is a subscription message used to subscribe to the type of the serving network, and the fourth message is a notification message. Alternatively, the third message is a query message used to query the type of the serving network, and the fourth message is a response message for the third message.

Further, when the third message is used to request the type information of the serving network of the terminal, the third message includes an identity of the terminal. When the third message is used to request the type information of the serving network of the group of the terminal, the third message includes an identity of a group of the terminal.

Further, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

Further, the third network element is an HSS-UDM integrated network element; or the third network element is a PCF-PCRF integrated network element; or the third network element is an MME; or the third network element is an AMF.

Figure 18:
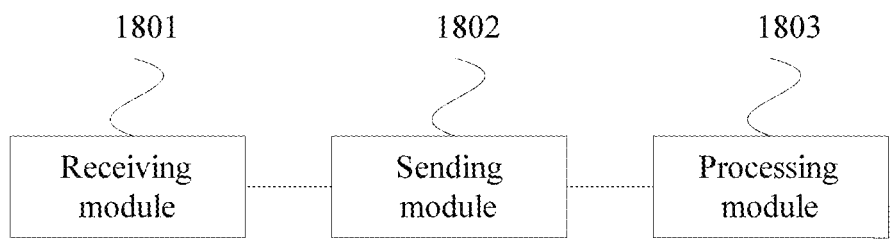
FIG. 18 is a structural diagram of modules in a fourth communications apparatus according to this application.

FIG. 18 is a structural diagram of modules in a fourth communications apparatus according to this application. The apparatus is applied to a third network element, and is configured to implement functions of the third network element in FIG. 5 and FIG. 6 to FIG. 9. As shown in FIG. 18, the apparatus includes a receiving module 1801, a sending module 1802, and a processing module 1803.

The receiving module 1801 is configured to receive a third message from a first network element, where the third message is used to request type information of a serving network of a terminal or a group of a terminal.

The processing module 1803 is configured to send the type information based on the third message using the sending module 1802.

Further, the type information includes a type of the serving network or indication information used to indicate that a type of the serving network changes.

Further, the type information is included in a fourth message. Additionally, the third message is a subscription message used to subscribe to the type of the serving network, and the fourth message is a notification message. Alternatively, the third message is a query message used to query the type of the serving network, and the fourth message is a response message for the third message.

Further, the processing module 1803 is configured such that when detecting that the type of the serving network changes, processing module 1803 sends, using the sending module 1802, the information used to indicate the type of the serving network.

Further, the processing module 1803 is configured to: query the type of the serving network based on the third message; and send the type of the serving network using the sending module 1802.

Further, the third network element is an HSS-UDM integrated network element; or the third network element is a PCF-PCRF integrated network element; or the third network element is an MME; or the third network element is an AMF.

Figure 19:
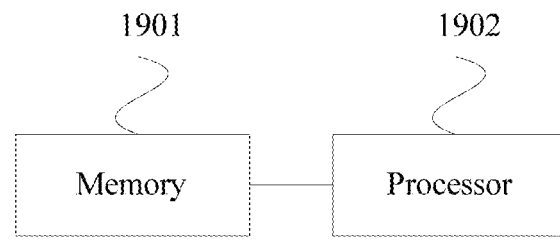
FIG. 19 is a physical block diagram of a first communications apparatus according to this application.

FIG. 19 is a physical block diagram of a first communications apparatus. The apparatus may be the first network element, or an apparatus disposed on the first network element. The first communications apparatus is configured to implement functions of the first network element in FIG. 4 and FIG. 10 to FIG. 14. As shown in FIG. 19, the apparatus includes a memory and a processor.

The memory 1901 is configured to store a program instruction.

The processor 1902 is configured to execute the program instruction in the memory 1901 to perform the following method: receiving identity information of a terminal from a second network element, where the identity information includes an identity of the terminal or an identity of a group of the terminal; obtaining, based on the identity information, type information of a serving network corresponding to the identity information; and sending API information of the first network element based on the type information.

Further, the type information includes a type of the serving network or indication information used to indicate that a type of the serving network changes.

Further, the identity information is included in a first message, and the API information is included in a second message.

Further, the first message is used to subscribe to an API support capability, and the second message is used to notify the API support capability. Alternatively, the first message is used to query an API support capability, and the second message is used to respond to the first message.

Further, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

Further, the processor 1902 is configured to: send a third message to a third network element, where the third message is used to request the type information; and receive the type information from the third network element.

Figure 20:
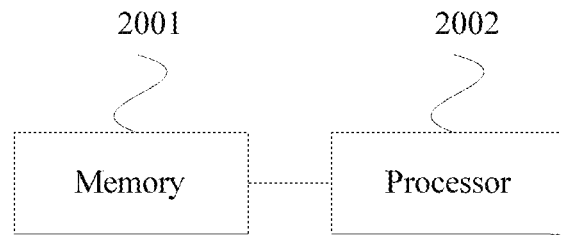
FIG. 20 is a physical block diagram of a second communications apparatus according to this application.

FIG. 20 is a physical block diagram of a second communications apparatus. The apparatus may be the second network element, or an apparatus disposed on the second network element. The second communications apparatus is configured to implement functions of the second network element in FIG. 4 and FIG. 10 to FIG. 14. As shown in FIG. 20, the apparatus includes a memory and a processor.

The memory 2001 is configured to store a program instruction.

The processor 2002 is configured to execute the program instruction in the memory 2001 to perform the following method: sending identity information of a terminal to a first network element, where the identity information includes an identity of the terminal or an identity of a group of the terminal; receiving API information of the first network element from the first network element; and invoking an API based on the API information.

Further, the identity information is included in a first message, and the API information is included in a second message.

Further, the first message is used to subscribe to an API support capability, and the second message is used to notify the API support capability. Alternatively, the first message is used to query an API support capability, and the second message is used to respond to the first message.

Further, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

Further, the processor 2002 is configured to: when the second network element triggers to invoke an API according to a service requirement, send the identity information of the terminal to the first network element; when a preset timer expires, send the identity information of the terminal to the first network element; or when the second network element receives, from the first network element, the indication information used to indicate that the API support capability changes, send the identity information of the terminal to the first network element.

Further, the processor 2002 is configured to: select an available API based on the API information; and invoke the selected API.

Figure 21:
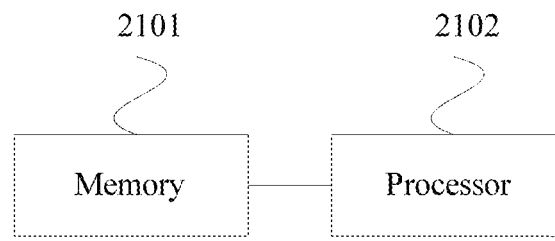
FIG. 21 is a physical block diagram of a third communications apparatus according to this application.

FIG. 21 is a physical block diagram of a third communications apparatus. The apparatus may be the first network element, or an apparatus disposed on the first network element. The third communications apparatus is configured to implement functions of the first network element in FIG. 5 and FIG. 6 to FIG. 9. As shown in FIG. 21, the apparatus includes a memory and a processor.

The memory 2101 is configured to store a program instruction.

The processor 2102 is configured to execute the program instruction in the memory 2101 to perform the following method: sending a third message to a third network element, where the third message is used to request type information of a serving network of a terminal or a group of a terminal; receiving the type information from the third network element; and sending API information of the first network element based on the type information.

Further, the type information includes a type of the serving network or indication information used to indicate that a type of the serving network changes.

Further, the type information is included in a fourth message. Additionally, the third message is a subscription message used to subscribe to the type of the serving network, and the fourth message is a notification message. Alternatively, the third message is a query message used to query the type of the serving network, and the fourth message is a response message for the third message.

Further, when the third message is used to request the type information of the serving network of the terminal, the third message includes an identity of the terminal. When the third message is used to request the type information of the serving network of the group of the terminal, the third message includes an identity of a group of the terminal.

Further, the API information includes API state information or an API invoke result, and the API state information includes at least one of the following information: indication information used to indicate that the API support capability changes, a list of available API(s), a list of unavailable API(s), or a list of API state(s), where the list of API state(s) includes an identity of an API and a state of the API.

Further, the third network element is an HSS-UDM integrated network element; or the third network element is a PCF-PCRF integrated network element; or the third network element is an MME; or the third network element is an AMF.

Figure 22:
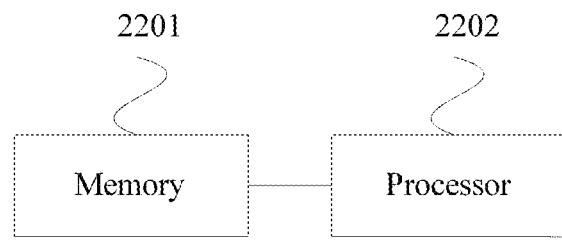
FIG. 22 is a physical block diagram of a fourth communications apparatus according to this application.

FIG. 22 is a physical block diagram of a fourth communications apparatus. The apparatus may be the third network element, or an apparatus disposed on the third network element. The fourth communications apparatus is configured to implement functions of the third network element in FIG. 5 and FIG. 6 to FIG. 9. As shown in FIG. 22, the apparatus includes a memory and a processor.

The memory 2201 is configured to store a program instruction.

The processor 2202 is configured to execute the program instruction in the memory 2201 to perform the following method: receiving a third message from a first network element, where the third message is used to request type information of a serving network of a terminal or a group of a terminal; and sending the type information based on the third message.

Further, the type information includes a type of the serving network or indication information used to indicate that a type of the serving network changes.

Further, the type information is included in a fourth message. Additionally, the third message is a subscription message used to subscribe to the type of the serving network, and the fourth message is a notification message. Alternatively, the third message is a query message used to query the type of the serving network, and the fourth message is a response message for the third message.

Further, the processor 2202 is configured such that when detecting that the type of the serving network changes, the processor 2202 sends the information used to indicate the type of the serving network.

Further, the processor 2202 is configured to: query the type of the serving network based on the third message; and send the type of the serving network.

Further, the third network element is an HSS-UDM integrated network element; or the third network element is a PCF-PCRF integrated network element; or the third network element is an MME; or the third network element is an AMF.

This application further provides a communications system. The communications system includes the first communications apparatus, the second communications apparatus, the third communications apparatus, and the fourth communications apparatus in the foregoing.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present application are all or partially generated. The computer may be a general-purpose computer, a special-purpose computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, through infrared, radio, or a microwave) manner. The computer readable storage medium may be any usable medium accessible to a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a disk memory, a compact disk (CD)-read-only memory (CD-ROM), and an optical memory) that include computer usable program code.

This application is described with reference to the flowcharts and/or block diagrams of the method, the apparatus (system), and the computer program product according to the embodiments of this application. It should be understood that the computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, such that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, such that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic concepts of the disclosure. Therefore, the following claims are intended to be construed as to cover the embodiments and all changes and modifications falling within the scope of this application.

It should be understood that various modifications and variations to this application can be made without departing from the spirit and scope of this application. This application is intended to cover these modifications and variations of this application provided that they fall within the scope of protection defined by the following claims and their equivalent technologies.

What is claimed is:

1. A communications apparatus comprising:
a non-transitory memory storage configured to store instructions; and
one or more processors in communication with the non-transitory memory storage and configured to execute the instructions to:
receive, from a second network element, a first message comprising identity information of a terminal, wherein the first message is for querying an application programming interface (API) support capability or subscribing to the API support capability, and wherein the identity information comprises a first identity of the terminal or a second identity of a group of the terminal;
obtain, based on the identity information, type information of a serving network corresponding to the identity information; and
send, based on the type information, a second message comprising API information of a first network element for the terminal or the group, wherein the second message is for responding to the first message or notifying the API support capability.

2. The communications apparatus according to claim 1, wherein the type information comprises a type of the serving network.

3. The communications apparatus according to claim 1, wherein the second message is for notifying the API support capability when the first message is for subscribing to the API support capability.

4. The communications apparatus according to claim 1, wherein the second message is for responding to the first message when the first message is for querying the API support capability.

5. The communications apparatus according to claim 1, wherein the API information comprises API state information.

6. The communications apparatus according to claim 5, wherein the API state information comprises a list of one or more available APIs.

7. The communications apparatus according to claim 1, wherein the one or more processors are further configured to execute the instructions to:
send a third message to a third network element, wherein the third message is for requesting the type information of the serving network; and
receive the type information from the third network element.

8. The communications apparatus according to claim 7, wherein the type information is in a fourth message, wherein the third message is a subscription message for subscribing to the type information of the serving network, and wherein the fourth message is a notification message.

9. The communications apparatus according to claim 8, wherein the subscription message comprises core network (CN) type change information for identifying a serving network type change event.

10. The communications apparatus according to claim 1, wherein the type information of the serving network is type information of a core network.

11. The communications apparatus according to claim 10, wherein the core network comprises an Evolved Packet Core (EPC) network or a $5^{th}$ generation (5G) core network.

12. The communications apparatus according to claim 1, wherein the first network element comprises at least one of a service capability exposure function or a network exposure function, and wherein the second network element comprises an application function.

13. A communications system, comprising:
a first network element configured to:
receive, from a second network element, a first message comprising identity information of a terminal, wherein the first message is for querying an application programming interface (API) support capability or subscribing to the API support capability, and wherein the identity information comprises a first identity of the terminal or a second identity of a group of the terminal;
send a third message requesting type information of a serving network;
receive the type information; and
send, based on the type information, a second message comprising API information of the first network element for the terminal or the group, wherein the second message is for responding to the first message or notifying the API support capability; and
a third network element configured to:
receive the third message from the first network element; and
send the type information to the first network element based on the third message.

14. The communications system according to claim 13, wherein the type information comprises a type of the serving network.

15. The communications system according to claim 13, wherein the first network element comprises at least one of a service capability exposure function or a network exposure function, and wherein the second network element comprises an application function.

16. The communications system according to claim 13, wherein the API information comprises API state information.

17. The communications system according to claim 16, wherein the API state information comprises a list of one or more available APIs.

18. The communications system according to claim 13, wherein the type information is in a fourth message, wherein the third message is a subscription message for subscribing to the type information of the serving network, and wherein the fourth message is a notification message.

19. The communications system according to claim 18, wherein the subscription message comprises core network (CN) Type Change identifying a serving network type change event.

20. The communications system according to claim 13, wherein the type information of the serving network is type information of a core network.

* * * * *